United States Patent
Nilsson et al.

(10) Patent No.: US 11,755,554 B2
(45) Date of Patent: *Sep. 12, 2023

(54) CHART ENGINE

(71) Applicant: QlikTech International AB, Lund (SE)

(72) Inventors: Johan Nilsson, Lund (SE); José Díaz López, Lund (SE)

(73) Assignee: QlikTech International AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/466,133

(22) Filed: Sep. 3, 2021

(65) Prior Publication Data

US 2022/0107930 A1     Apr. 7, 2022

Related U.S. Application Data

(63) Continuation of application No. 15/984,098, filed on May 18, 2018, now Pat. No. 11,144,525.

(60) Provisional application No. 62/505,591, filed on May 12, 2017.

(51) Int. Cl.
  *G06F 16/22*     (2019.01)
  *G06F 16/2455*   (2019.01)

(52) U.S. Cl.
  CPC ...... *G06F 16/2264* (2019.01); *G06F 16/2237* (2019.01); *G06F 16/2255* (2019.01); *G06F 16/2282* (2019.01); *G06F 16/24553* (2019.01)

(58) Field of Classification Search
  CPC .. G06F 16/283; G06F 16/278; G06F 16/2282; G06F 16/2255; G06F 16/2264; G06F 16/2237
  USPC .................................. 707/715, 722
  See application file for complete search history.

(56) References Cited

U.S. PATENT DOCUMENTS

| | | |
|---|---|---|
| 6,629,095 B1 | 9/2003 | Wagstaff |
| 7,058,621 B1 | 6/2006 | Wolgé |
| 8,244,741 B2 | 8/2012 | Wolgé |
| 8,745,099 B2 | 6/2014 | Wolgé et al. |
| 2003/0004938 A1 | 1/2003 | Lawder |
| 2004/0215641 A1 | 10/2004 | Kothuri |
| 2004/0267765 A1 | 12/2004 | Tkachuk |
| 2004/0267799 A1* | 12/2004 | Petculescu ............ G06F 16/283 707/999.102 |
| 2008/0114793 A1* | 5/2008 | Grosset ................ G06F 16/2264 |
| 2014/0108467 A1 | 4/2014 | Tutuk et al. |
| 2016/0062586 A1 | 3/2016 | Muller |

OTHER PUBLICATIONS

Bellatreche, L., Chapter 2: Dimension Table Selection Strategies to Referential Partition a Fact Table of Relational Data Warehouses. Recent Trends in Information Reuse and Integration. 2012; pp. 19-41 (24 pages).

(Continued)

*Primary Examiner* — Robert W Beausoliel, Jr.
*Assistant Examiner* — Pedro J Santos
(74) *Attorney, Agent, or Firm* — Ballard Spahr LLP

(57) ABSTRACT

In an aspect, provided is a method comprising receiving an expression involving one or more dimensions, determining one or more indexlets associated with the one or more dimensions, querying each of the one or more indexlets with the expression, receiving a result from each of the one or more indexlets, and aggregating the results.

16 Claims, 24 Drawing Sheets

(56) References Cited

OTHER PUBLICATIONS

Lane, P. et al., "Oracle Database Data Warehousing Guide, IIg Release 1 (11.1)",(2007), p. I-XXVI, Retrieved from the Internet: <URL: https://docs.oracle.com/cd/B28359_01/server.111/b28313.pdf> [retrieved on Aug. 9, 2017] (50 pages).
European Search Report and Written Opinion dated Sep. 25, 2018 for EP 18171529.3, (8 pages).
European Search Report and Written Opinion dated Sep. 25, 2018 for EP 21207938.8, (11 pages).

* cited by examiner

FIG. 4

| Client | Year | Sum (Number * Price) |
|---|---|---|
| Nisse | 1999 | 19.5 |
| Gullan | 1999 | 37.5 |
| Kalle | 1999 | 60 |
| Pekka | <NULL> | 75 |
| <ALL> | 1999 | 117 |
| <ALL> | <NULL> | 75 |
| Nisse | <ALL> | 19.5 |
| Gullan | <ALL> | 37.5 |
| Kalle | <ALL> | 60 |
| Pekka | <ALL> | 75 |
| <ALL> | <ALL> | 192 |

Table 6

**Sum (Number * Price) Per Client, Year**

|  | 1999 | <NULL> | <ALL> |
|---|---|---|---|
| Nisse | 19.5 |  | 19.5 |
| Gullan | 37.5 |  | 37.5 |
| Kalle | 60 |  | 60 |
| Pekka |  | 75 | 75 |
| <ALL> | 117 | 75 | 192 |

Table 7

FIG. 10
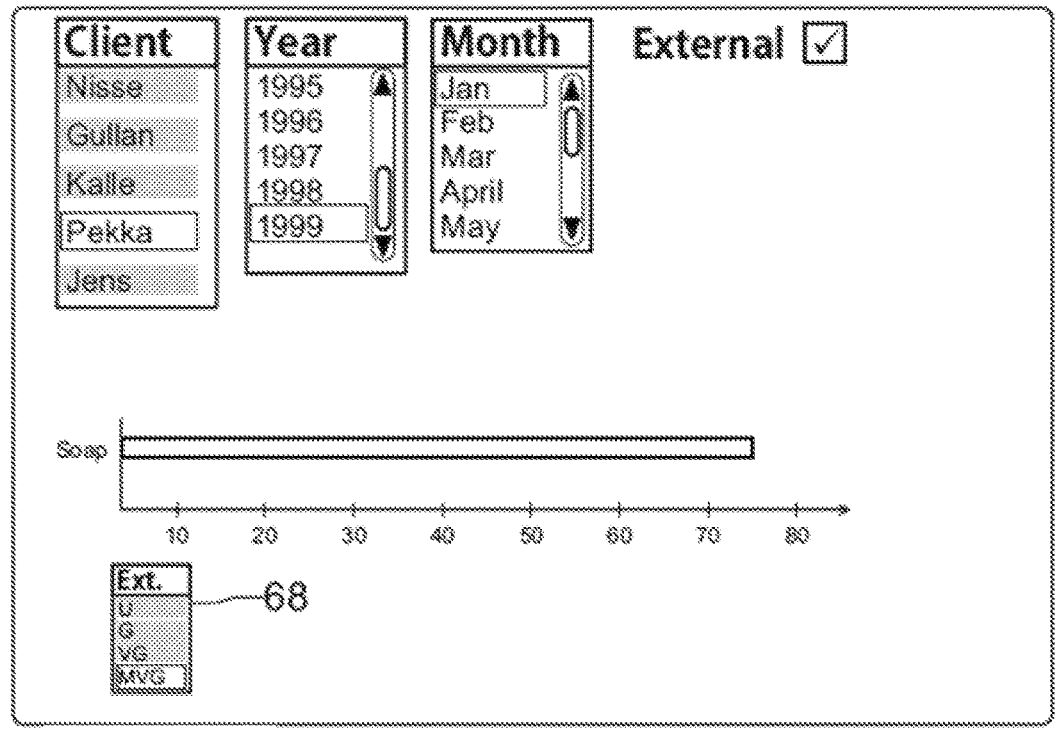
FIG. 11
| | | | Sum(Price*Number) | ExtQualification(Price*Number) |
|---|---|---|---|---|
| Pekka | 1999 | Jan | {7.5*10} | {MVG} |
(Pekka, 1999, Jan, {75})  
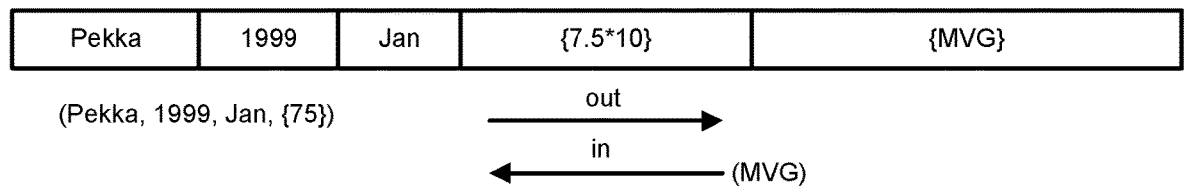
FIG. 12
| Client | Year | Month | Sum(Price*Number) | ExtQualification(Sum(Price*Number)) |
|---|---|---|---|---|
| Nisse | 1999 | Jan. | 19.5 | G |
| Kalle | 1999 | Jan. | 60 | VG |
| Gullan | 1999 | Jan. | 37.5 | VG |
| Jens | - | - | - | U |
| Pekka | 1999 | Jan. | 75 | MVG |

CHART ENGINE

CROSS REFERENCE TO RELATED PATENT APPLICATIONS

This application is a continuation of U.S. Non-Provisional application Ser. No. 15/984,098, filed on May 18, 2018, which claims priority to U.S. Provisional Application No. 62/505,591, filed on May 12, 2017, each of which are incorporated by reference in their entireties herein.

SUMMARY

It is to be understood that both the following general description and the following detailed description are exemplary and explanatory only and are not restrictive, as claimed. Provided are methods and systems for data management and analysis.

In an aspect, provided is a method comprising receiving an expression involving one or more dimensions, determining one or more indexlets associated with the one or more dimensions, querying each of the one or more indexlets with the expression, receiving a result from each of the one or more indexlets, and aggregating the results.

In an aspect, provided is a method comprising receiving a user selection of data, wherein the data comprises one or more tables, determining distinct values in all related tables that are relevant to the user selection based on at least one of one or more indexlets or an attribute to attribute (A2A) index, performing a first calculation on the distinct values to create a first hypercube, and generating a graphical object based on the first hypercube.

In an aspect, provided is a method comprising receiving a user selection of data, wherein the data comprises one or more tables, determining distinct values in all related tables that are relevant to the user selection based on at least one of one or more indexlets or an attribute to attribute (A2A) index, performing a first calculation on the distinct values to create a first hypercube, and generating a graphical object based on the first hypercube.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 4 is tables showing a final data structure, e.g. a multidimensional cube, created by evaluating mathematical functions;

FIG. 10 is a schematic graphical presentation showing selections and a diagram of data associated to the selections as received after third computations from an external engine;

FIG. 11 is a schematic representation of data exchanged with an external engine based on selections in FIG. 10;

FIG. 12 is a table showing results from computations based on different selections in the presentation of FIG. 10;

DETAILED DESCRIPTION

Figure 1:
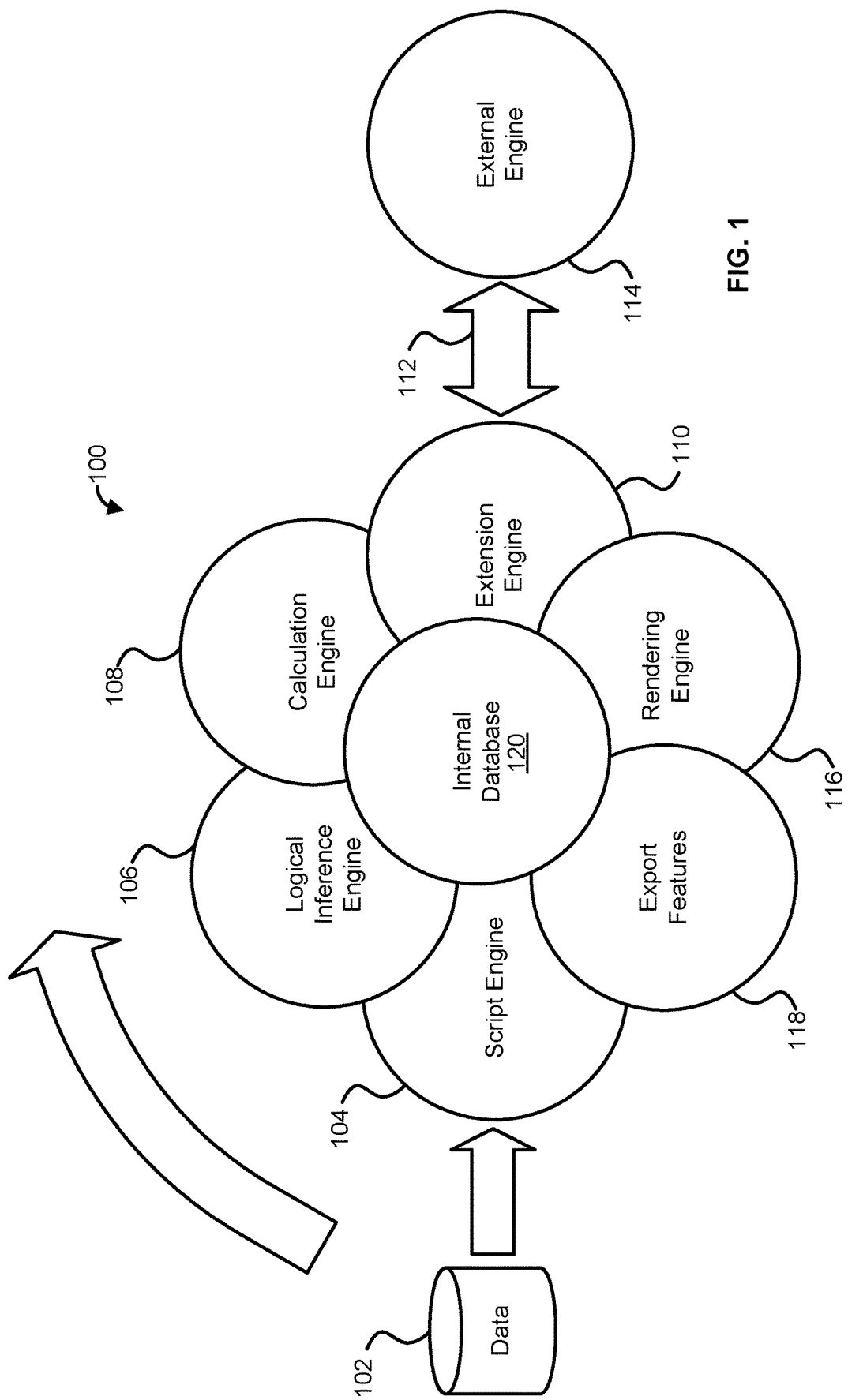
FIG. 1 is a schematic diagram showing an embodiment of a system forming an implementation of the disclosed methods.

Before the present methods and systems are disclosed and described in more detail, it is to be understood that the methods and systems are not limited to specific steps, processes, components, or structure described, or to the order or particular combination of such steps or components as described. It is also to be understood that the terminology used herein is for the purpose of describing exemplary embodiments only and is not intended to be restrictive or limiting.

As used herein the singular forms "a," "an," and "the" include both singular and plural referents unless the context clearly dictates otherwise. Values expressed as approximations, by use of antecedents such as "about" or "approximately," shall include reasonable variations from the referenced values. If such approximate values are included with ranges, not only are the endpoints considered approximations, the magnitude of the range shall also be considered an approximation. Lists are to be considered exemplary and not restricted or limited to the elements comprising the list or to the order in which the elements have been listed unless the context clearly dictates otherwise.

Throughout the specification and claims of this disclosure, the following words have the meaning that is set forth: "comprise" and variations of the word, such as "comprising" and "comprises," mean including but not limited to, and are not intended to exclude, for example, other additives, components, integers or steps. "Exemplary" means "an example of", but not essential, necessary, or restricted or limited to, nor does it convey an indication of a preferred or ideal embodiment. "Include" and variations of the word, such as "including" are not intended to mean something that is restricted or limited to what is indicated as being included, or to exclude what is not indicated. "May" means something that is permissive but not restrictive or limiting. "Optional" or "optionally" means something that may or may not be included without changing the result or what is being described. "Prefer" and variations of the word such as "preferred" or "preferably" mean something that is exemplary and more ideal, but not required. "Such as" means something that is exemplary.

Steps and components described herein as being used to perform the disclosed methods and construct the disclosed systems are exemplary unless the context clearly dictates otherwise. It is to be understood that when combinations, subsets, interactions, groups, etc. of these steps and components are disclosed, that while specific reference of each various individual and collective combinations and permutation of these may not be explicitly disclosed, each is specifically contemplated and described herein, for all methods and systems. This applies to all aspects of this application including, but not limited to, steps in disclosed methods and/or the components disclosed in the systems. Thus, if there are a variety of additional steps that can be performed or components that can be added, it is understood that each of these additional steps can be performed and components added with any specific embodiment or combination of embodiments of the disclosed systems and methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices, whether internal, networked or cloud based.

Embodiments of the methods and systems are described below with reference to diagrams, flowcharts and other illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to computer implemented methods and systems for data management, data analysis, and processing. The disclosed methods and systems can incorporate external data analysis into an otherwise closed data analysis environment. A typical environment for the systems and methods described herein is for assisting in a computer implemented method for building and updating a multi-dimensional cube data structure, such as, e.g., the systems and methods described in U.S. Pat. Nos. 7,058,621; 8,745,099; 8,244,741; and U.S. patent application Ser. No. 14/054,321, which are incorporated by reference in their entireties.

In an aspect, the methods and systems can manage associations among data sets with every data point in the analytic dataset being associated with every other data point in the dataset. Datasets can be larger than hundreds of tables with thousands of fields. A multi-dimensional dataset or array of data is referred to as an OnLine Analytic Processing (OLAP) cube. A cube can be considered a multi-dimensional generalization of a two- or three-dimensional spreadsheet. For example, it may be desired to summarize financial data by product, by time-period, and by city to compare actual and budget expenses. Product, time, city, and scenario (actual and budget) can be referred to as dimensions. A multi-dimensional dataset is normally called a hypercube if the number of dimensions is greater than 3. A hypercube can comprise tuples made of two (or more) dimensions and one or more expressions.

FIG. 1 illustrates an associative data indexing engine 100 with data flowing in from the left and operations starting from a script engine 104 and going clockwise (indicated by the clockwise arrow) to export features 118. Data from a data source 102 can be extracted by a script engine 104. The data source 102 can comprise any type of known database, such as relational databases, post-relational databases, object-oriented databases, hierarchical databases, flat files, spread sheet, etc. The Internet may also be regarded as a database in the context of the present disclosure. A visual interface can be used as an alternative or combined with a script engine 104. The script engine 104 can read record by record from the data source 102 and data can be stored or appended to symbol and data tables in an internal database 120. Read data can be referred to as a data set.

In an aspect, the extraction of the data can comprise extracting an initial data set or scope from the data source 102, e.g. by reading the initial data set into the primary memory (e.g. RAM) of the computer. The initial data set can comprise the entire contents of the data source 102 base, or a subset thereof. The internal database 120 can comprise the extracted data and symbol tables. Symbol tables can be created for each field and, in one aspect, can only contain the distinct field values, each of which can be represented by their clear text meaning and a bit filled pointer. The data tables can contain said bit filled pointers.

In the case of a query of the data source 102, a scope can be defined by the tables included in a SELECT statement (or equivalent) and how these are joined. In an aspect, the SELECT statement can be SQL (Structured Query Language) based. For an Internet search, the scope can be an index of found web pages, for example, organized as one or more tables. A result of scope definition can be a data set.

Once the data has been extracted, a user interface can be generated to facilitate dynamic display of the data. By way of example, a particular view of a particular dataset or data subset generated for a user can be referred to as a state space or a session. The methods and systems can dynamically generate one or more visual representations of the data to present in the state space.

A user can make a selection in the data set, causing a logical inference engine 106 to evaluate a number of filters on the data set. For example, a query on a database that holds data of placed orders, could be requesting results matching an order year of '1999' and a client group be 'Nisse.' The selection may thus be uniquely defined by a list of included fields and, for each field, a list of selected values or, more generally, a condition. Based on the selection, the logical inference engine 106 can generate a data subset that represents a part of the scope. The data subset may thus contain a set of relevant data records from the scope, or a list of references (e.g. indices, pointers, or binary numbers) to these relevant data records. The logical inference engine 106 can process the selection and can determine what other selections are possible based on the current selections. In an aspect, flags can enable the logical inference engine 106 to work out the possible selections. By way of example, two flags can be used: the first flag can represent whether a value is selected or not, the second can represent whether or not a value selection is possible. For every click in an application, states and colors for all field values can be calculated. These can be referred to as state vectors, which can allow for state evaluation propagation between tables.

The logical inference engine 106 can utilize an associative model to connect data. In the associative model, all the fields in the data model have a logical association with every other field in the data model. An example, data model 501 is shown in FIG. 5B. The data model 501 illustrates connections between a plurality of tables which represent logical associations. Depending on the amount of data, the data model 501 can be too large to be loaded into memory. To address this issue, the logical inference engine 106 can generate one or more indexes for the data model. The one or more indexes can be loaded into memory in lieu of the data model 501. The one or more indexes can be used as the associative model. An index is used by database management programs to provide quick and efficient associative access to a table's records. An index is a data structure (for example, a B-tree, a hash table, and the like) that stores attributes (e.g., values) for a specific column in a table. A B-tree is a self-balancing tree data structure that keeps data sorted and allows searches, sequential access, insertions, and deletions in logarithmic time. The B-tree is a generalization of a binary search tree in that a node can have more than two children. A hash table (also referred to as a hash index) can comprise a collection of buckets organized in an array. A hash function maps index keys to corresponding buckets in the hash index.

Queries that compare for equality to a string can retrieve values very fast using a hash index. For instance, referring to the tables of FIG. 2, a query of SELECT*FROM Table 2 WHERE Client='Kalle') could benefit from a hash index created on the Client column. In this example, the hash index would be configured such that the column value will be the key into the hash index and the actual value mapped to that key would just be a pointer to the row data in Table 2. Since a hash index is an associative array, a typical entry can comprise "Kalle=>0x29838", where 0x29838 is a reference to the table row where Kalle is stored in memory. Thus, looking up a value of "Kalle" in a hash index can return a reference to the row in memory which is faster than scanning Table 2 to find all rows with a value of "Kalle" in the Client column. The pointer to the row data enables retrieval of other values in the row.

As shown in FIG. 5B, the logical inference engine 106 can be configured for generating one or more bidirectional table indexes (BTI) 502*a*, 502*b*, 502*c*, 502*d*, and/or 502*e* and one or more bidirectional associative indexes (BAI) 503*a*, 503*b*, 503*c* and/or 503*d* based on a data model 501. The logical inference engine 106 can scan each table in the data model 501 and create the BTI 502*a*, 502*b*, 502*c*, 502*d*, and/or 502*e*. A BTI can be created for each column of each table in the data. The BTI 502*a*, 502*b*, 502*c*, 502*d*, and/or 502*e* can comprise a hash index. The BTI 502*a*, 502*b*, 502*c*, 502*d*, and/or 502*e* can comprise first attributes and pointers to the table rows comprising the first attributes. For example, referring to the tables of FIG. 2, an example BTI 502*a* can comprise "Kalle=>0x29838", where Kalle is an attribute found in Table 2 and 0x29838 is a reference to the row in Table 2 where Kalle is stored in memory. Thus, the BTI 502*a*, 502*b*, 502*c*, 502*d*, and/or 502*e* can be used to determine other attributes in other columns (e.g., second attributes, third attributes, etc. . . . ) in table rows comprising the first attributes. Accordingly, the BTI can be used to determine that an association exists between the first attributes and the other attributes.

The logical inference engine 106 can scan one or more of BTI 502*a*, 502*b*, 502*c*, 502*d*, and/or 502*e* and create the BAI 503*a*, 503*b*, 503*c* and/or 503*d*. The BAI 503*a*, 503*b*, 503*c* and/or 503*d* can comprise a hash index. The BAI 503*a*, 503*b*, 503*c* and/or 503*d* can comprise an index configured for connecting attributes in a first table to common columns in a second table. The BAI 503*a*, 503*b*, 503*c* and/or 503*d* thus allows for identification of rows in the second table which then permits identification of other attributes in other tables. For example, referring to the tables of FIG. 2, an example BAI 503*a* can comprise "Kalle=>0x39838", where Kalle is an attribute found in Table 2 and 0x39838 is a reference to a row in Table 4 that contains Kalle. In an aspect, the reference can be to a hash that can be in-memory or on disk.

Using the BTI 502a, 502b, 502c, 502d, and/or 502e and the BAI 503a, 503b, 503c, and/or 503d, the logical inference engine 106 can generate an index window 504 by taking a portion of the data model 501 and mapping it into memory. The portion of the data model 501 taken into memory can be sequential (e.g., not random). The result is a significant reduction in the size of data required to be loaded into memory.

In an aspect, bidirectional indexing using BTIs can have limits as to how much parallelization can be applied when processing the data model 501. To improve parallelization applied to the data model 501, the logical inference engine 106 can generate bidirectional indexes for partitions for a table in the data model 501. Such bidirectional indexes are hereinafter referred to as "indexlets." In an aspect, the logical inference engine 106 can generate indexlets for a given table by partitioning the table into blocks of rows. In an aspect, the blocks of rows can be of a same size. In an aspect, a last block of rows can be of a size less than the remaining blocks of rows. In an aspect, after partitioning the blocks of rows, the logical inference engine can generate an indexlet for each of the blocks of rows. In an aspect, generating an indexlet for a given block of rows comprises generating a bidirectional index as described above, but limited in scope to the given block of rows.

Figure 5A:
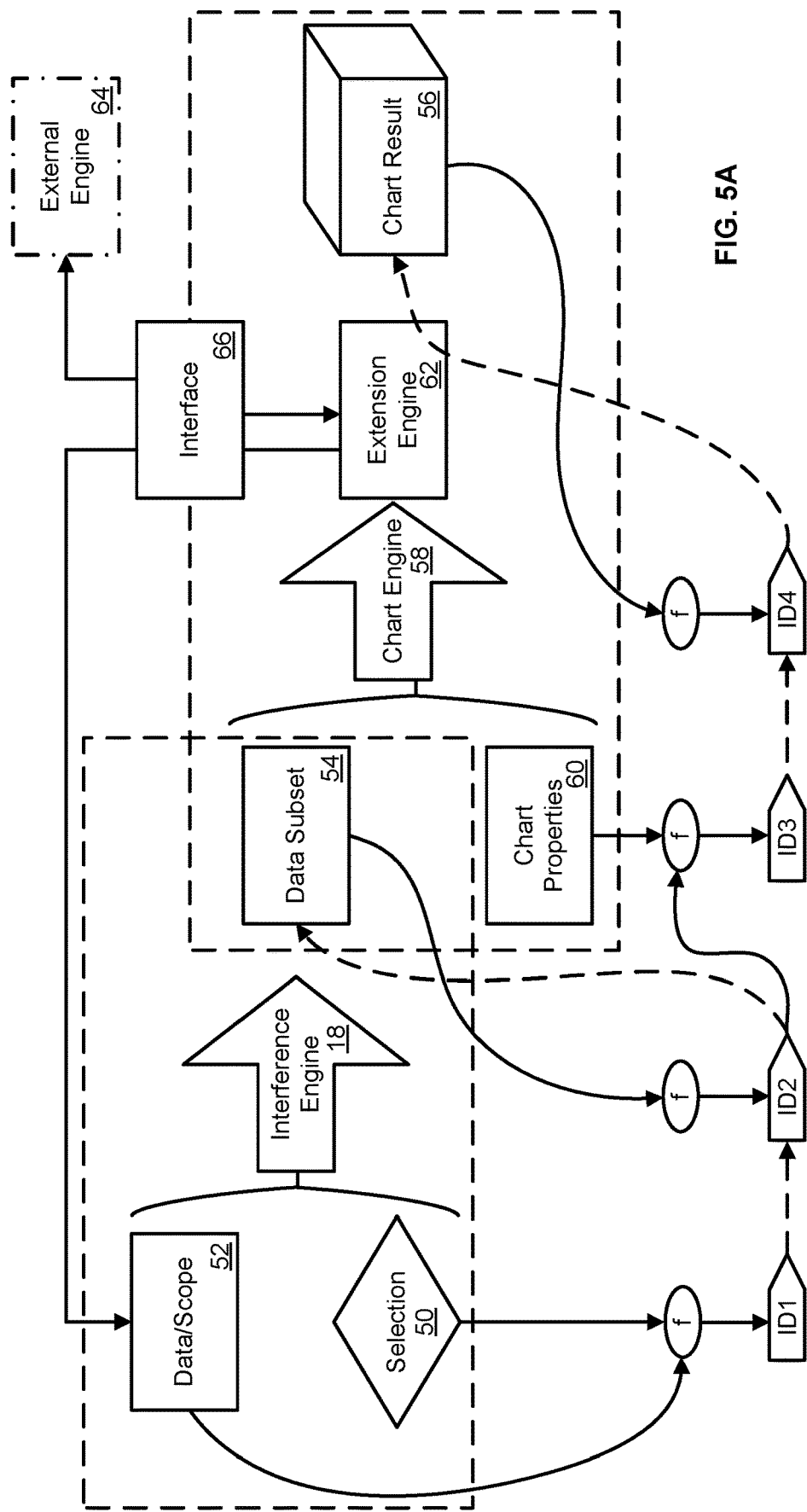
FIG. 5A is a schematic diagram showing how a selection by a user operates on a scope to generate a data subset.
Figure 5B:
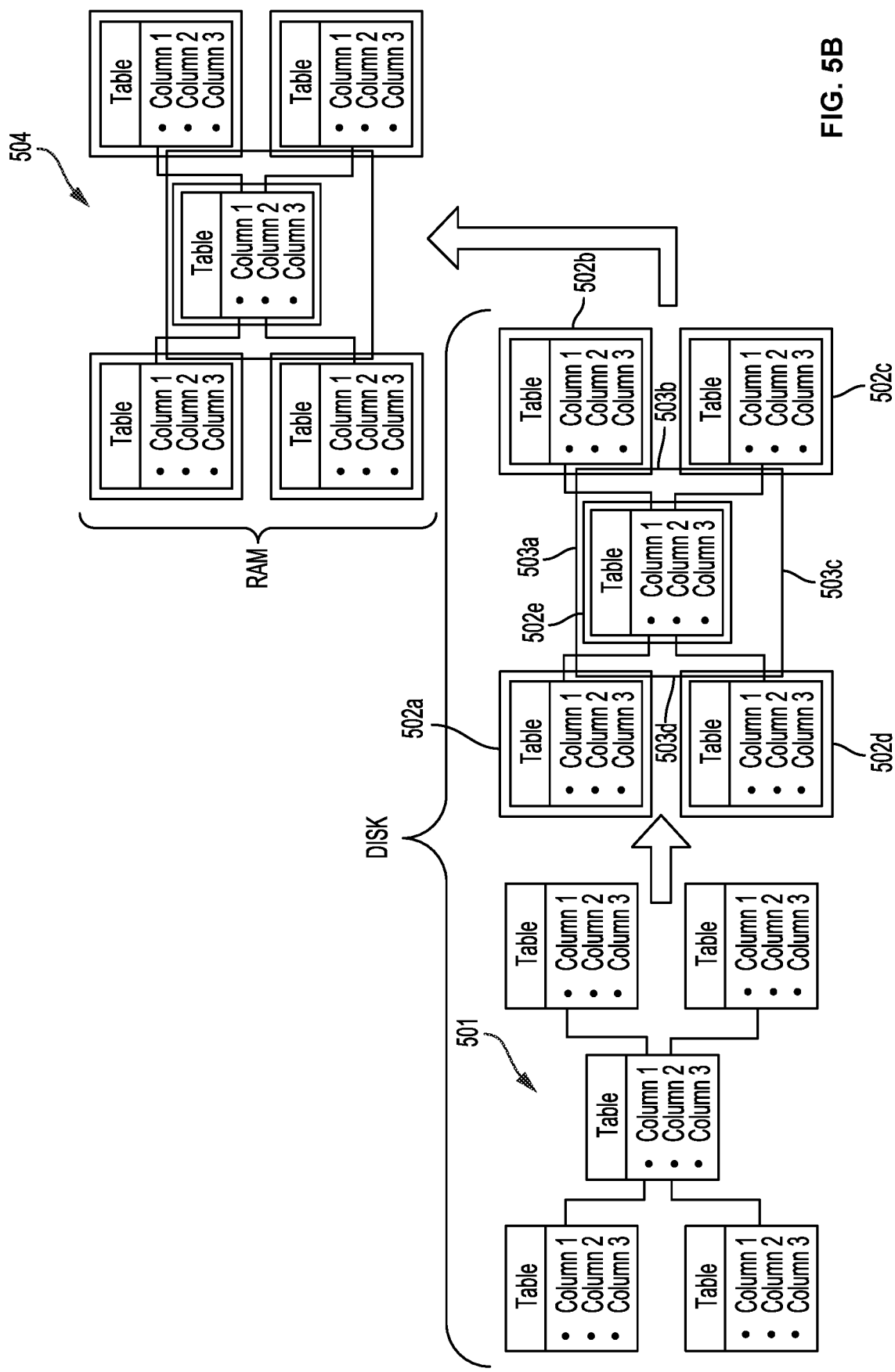
FIG. 5B is an overview of the relations between data model, indexes in disk and windowed view of disk indexes in memory.
Figure 5C:
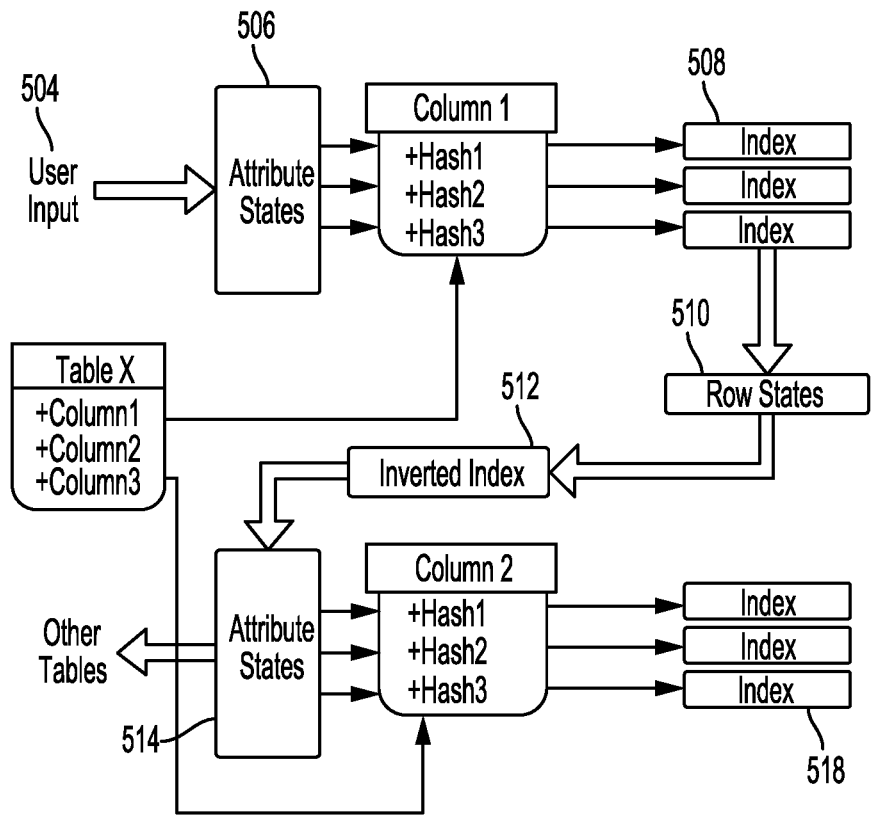
FIG. 5C is a representation of the data structure used for table handling.
Figure 5D:
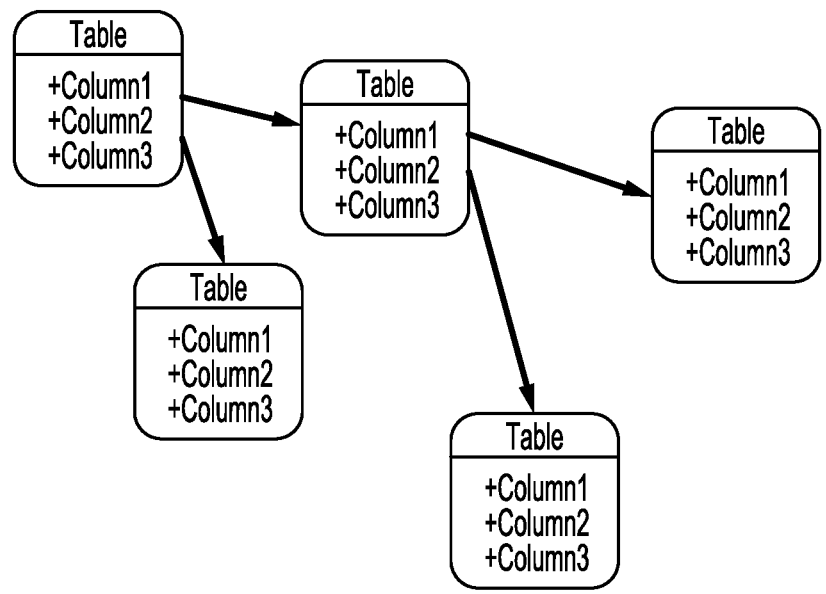
FIG. 5D is a table tree representation of a data model.
Figure 5E:
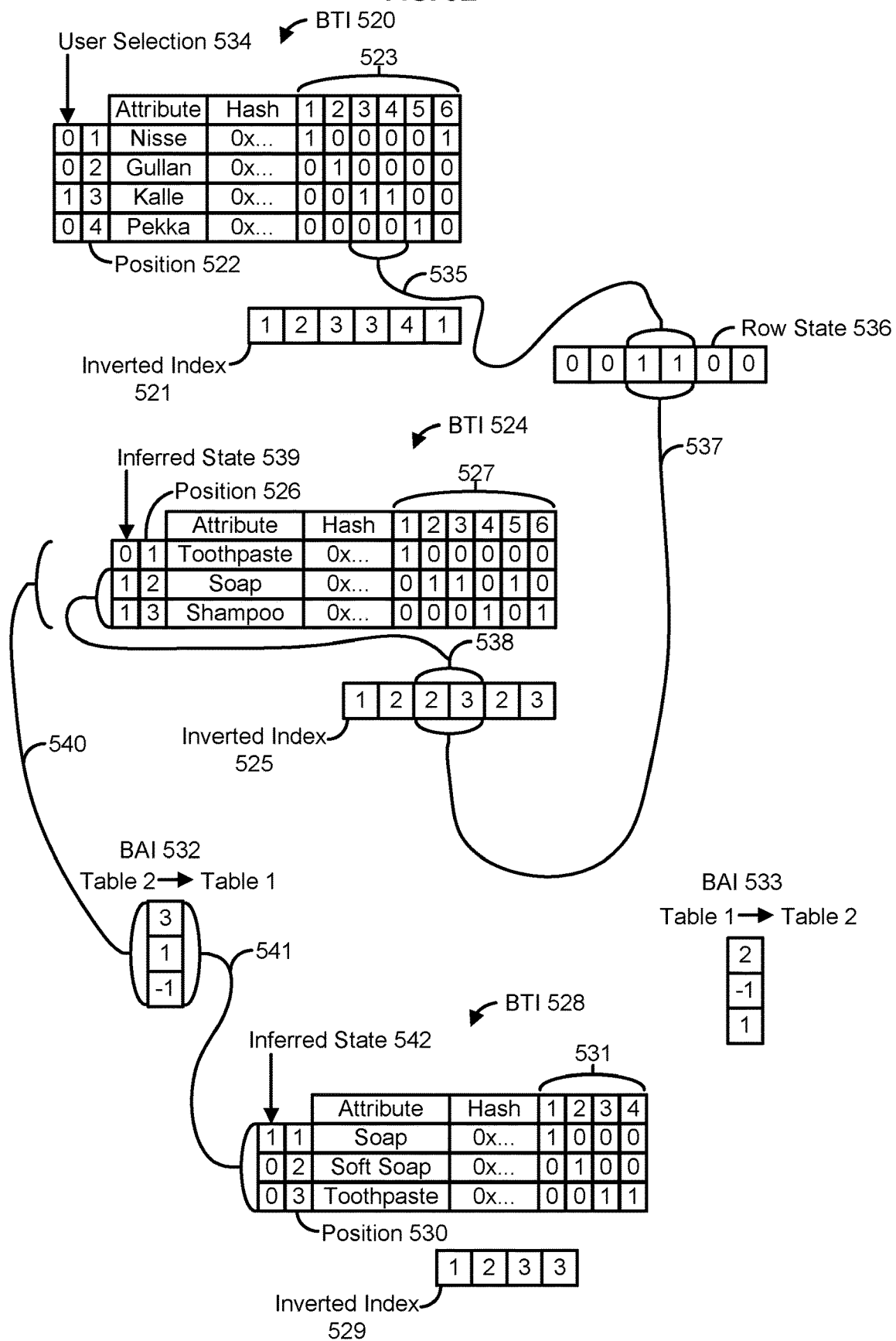
FIG. 5E illustrates an example application of bidirectional table indexes and bidirectional association indexes.
Figure 5F:
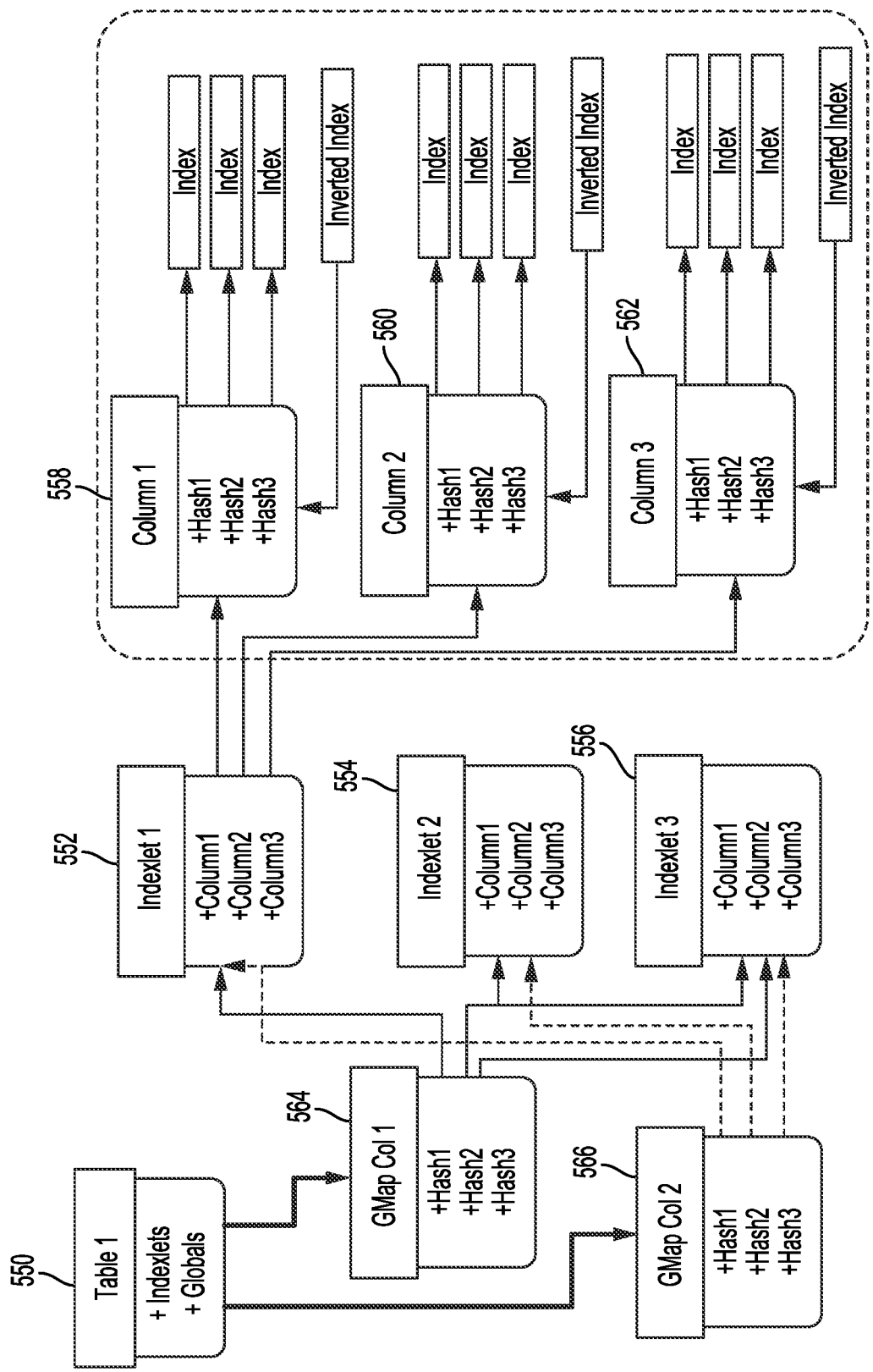
FIG. 5F is a representation of the data structure used for indexlets.

A representation of a data structure for indexlets is shown in FIG. 5F. Rows of a given table 550 can be divided into block bidirectionally indexed by indexlets 552, 554 and 556, respectively. In the example of FIG. 5F, the indexlet 552 can include pointers or references to respective columns 558, 560, and 562 as set forth above with respect to bidirectional table indexes. Each of the indexlets 552, 554, and 556 are logically associated with a bidirectional global attribute lists 564 and 566 that index a particular attribute to the blocks it is present in. Accordingly, an entry in the bidirectional global attribute list 564 and 566 for a given attribute can comprise a reference to an indexlet corresponding to a block having the respective attribute. In an aspect, the reference can include a hash reference. In an aspect, as shown in FIG. 5H, an implicit relationship exists between indexlets in different tables through a common field present in both tables and an attribute-to-attribute (A2A) index.

Thus, the logical inference engine 106 can determine a data subset based on user selections. The logical inference engine 106 automatically maintains associations among every piece of data in the entire data set used in an application. The logical inference engine 106 can store the binary state of every field and of every data table dependent on user selection (e.g., included or excluded). This can be referred to as a state space and can be updated by the logical inference engine 106 every time a selection is made. There is one bit in the state space for every value in the symbol table or row in the data table, as such the state space is smaller than the data itself and faster to query. The inference engine will work associating values or binary symbols into the dimension tuples. Dimension tuples are normally needed by a hypercube to produce a result.

The associations thus created by the logical inference engine 106 means that when a user makes a selection, the logical inference engine 106 can resolve (quickly) which values are still valid (e.g., possible values) and which values are excluded. The user can continue to make selections, clear selections, and make new selections, and the logical inference engine 106 will continue to present the correct results from the logical inference of those selections. In contrast to a traditional join model database, the associative model provides an interactive associative experience to the user.

FIG. 5C illustrates an example application of one or more BTIs. User input 504 can be received that impacts a selection of one or more attribute states 506. Attribute states 506 can correspond to selection by a user of one or more attributes (e.g., values) found in Column 1 of Table X. In an aspect, the one or more attributes of Table X can comprise a hash of each respective attribute. One or more BTI's 508 can be accessed to determine one or more rows in Table X that comprise the attributes selected by the user. Row states 510 can correspond to selection of one or more rows found in Table X that comprise the one or more selected attributes. An inverted index 512 of Column 2 can be accessed to identify which rows of Table 1 comprise associated attributes. Attribute states 514 for Column 2 can be updated to reflect the associated attributes of Column 2. One or more BTI's 518 can be further accessed to determine other associated attributes in other columns as needed. Attribute states 514 can be applied to other tables via one or more BAIs. FIG. 5D illustrates an example of relationships identified by one or more BAIs.

Figure 2:
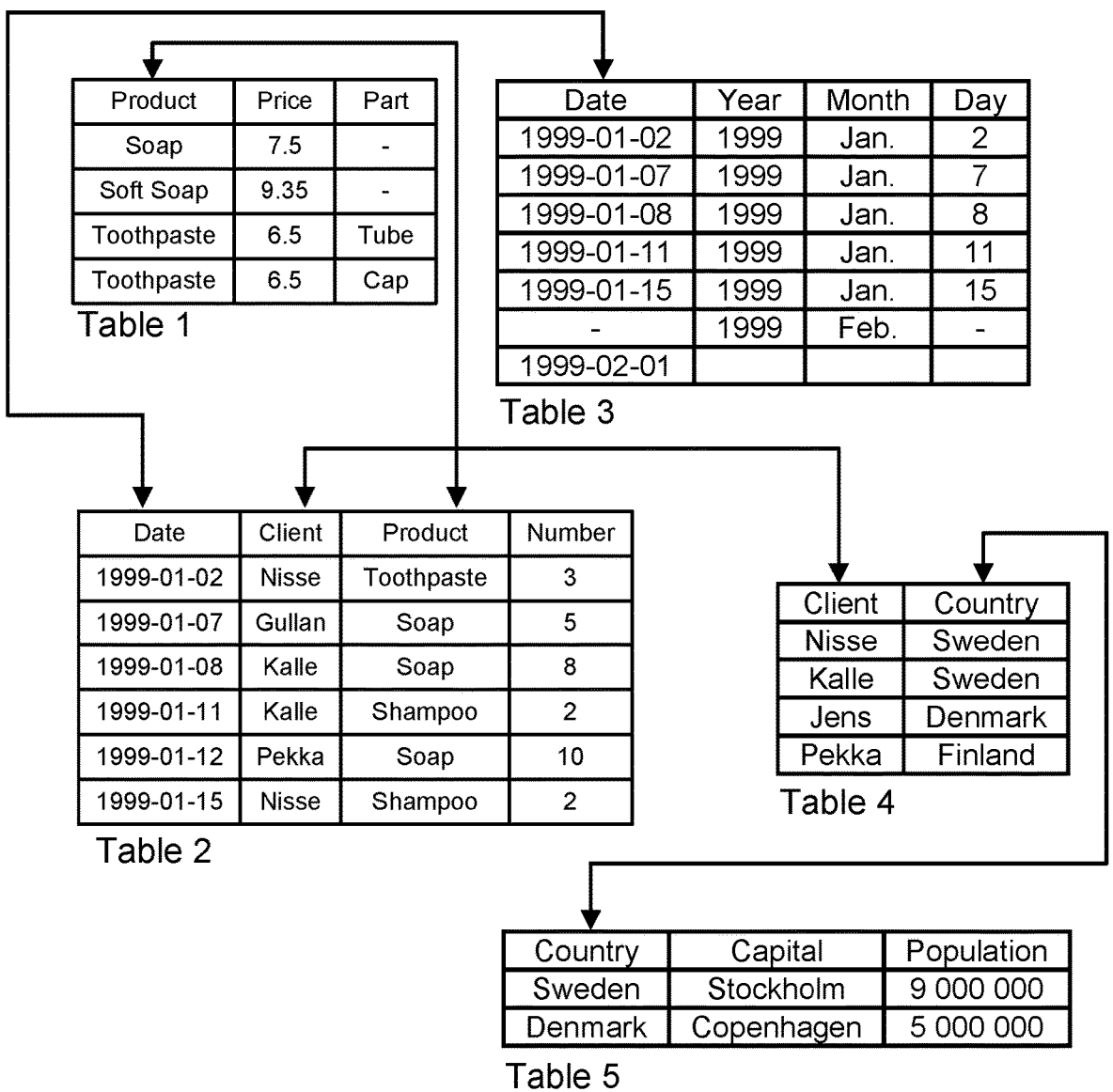
FIG. 2 is a set of tables showing exemplary Tables 1-5 of a simple database and associations between variables in the tables.

FIG. 5E illustrates an example application of BTI's and BAI's to determine inferred states both inter-table and intra-table using Table 1 and Table 2 of FIG. 2. A BTI 520 can be generated for the "Client" attribute of Table 2. In an aspect, the BTI 520 can comprise an inverted index 521. In other aspect, the inverted index 521 can be considered a separate structure. The BTI 520 can comprise a row for each unique attribute in the "Client" column of Table 2. Each unique attribute can be assigned a corresponding position 522 in the BTI 520. In an aspect, the BTI 520 can comprise a hash for each unique attribute. The BTI 520 can comprise a column 523 for each row of Table 2. For each attribute, a "1" can indicate the presence of the attribute in the row and a "0" can indicate an absence of the attribute from the row. "0" and "1" are merely examples of values used to indicate presence or absence. Thus, the BTI 520 reflects that the attribute "Nisse" is found in rows 1 and 6 of Table 2, the attribute "Gullan" is found in row 2 of Table 2, the attribute "Kalle" is found in rows 3 and 4 of Table 2, and the attribute "Pekka" is found in row 5 of Table 2.

The inverted index 521 can be generated such that each position in the inverted index 521 corresponds to a row of Table 2 (e.g., first position corresponds to row 1, second position corresponds to row 2, etc. . . . ). A value can be entered into each position that reflects the corresponding position 522 for each attribute. Thus, in the inverted index 521, position 1 comprises the value "1" which is the corresponding position 522 value for the attribute "Nisse", position 2 comprises the value "2" which is the corresponding position 522 value for the attribute "Gullan", position 3 comprises the value "3" which is the corresponding position 522 value for the attribute "Kalle", position 4 comprises the value "3" which is the corresponding position 522 value for the attribute "Kalle", position 5 comprises the value "4" which is the corresponding position 522 value for the attribute "Pekka", and position 6 comprises the value "1" which is the corresponding position 522 value for the attribute "Nisse".

A BTI 524 can be generated for the "Product" attribute of Table 2. In an aspect, the BTI 524 can comprise an inverted index 525. In other aspect, the inverted index 525 can be considered a separate structure. The BTI 524 can comprise a row for each unique attribute in the "Product" column of Table 2. Each unique attribute can be assigned a corresponding position 526 in the BTI 524. In an aspect, the BTI 524 can comprise a hash for each unique attribute. The BTI 524 can comprise a column 527 for each row of Table 2. For each attribute, a "1" can indicate the presence of the attribute in the row and a "0" can indicate an absence of the attribute from the row. "0" and "1" are merely examples of values used to indicate presence or absence. Thus, the BTI 524 reflects that the attribute "Toothpaste" is found in row 1 of Table 2, the attribute "Soap" is found in rows 2, 3, and 5 of Table 2, and the attribute "Shampoo" is found in rows 4 and 6 of Table 2.

By way of example, the inverted index 525 can be generated such that each position in the inverted index 525 corresponds to a row of Table 2 (e.g., first position corresponds to row 1, second position corresponds to row 2, etc. . . . ). A value can be entered into each position that reflects the corresponding position 526 for each attribute. Thus, in the inverted index 525, position 1 comprises the value "1" which is the corresponding position 526 value for the attribute "Toothpaste", position 2 comprises the value "2" which is the corresponding position 526 value for the attribute "Soap", position 3 comprises the value "2" which is the corresponding position 526 value for the attribute "Soap", position 4 comprises the value "3" which is the corresponding position 526 value for the attribute "Shampoo", position 5 comprises the value "2" which is the corresponding position 526 value for the attribute "Soap", and position 6 comprises the value "3" which is the corresponding position 526 value for the attribute "Shampoo".

By way of example, a BTI 528 can be generated for the "Product" attribute of Table 1. In an aspect, the BTI 528 can comprise an inverted index 529. In other aspect, the inverted index 529 can be considered a separate structure. The BTI 528 can comprise a row for each unique attribute in the "Product" column of Table 1. Each unique attribute can be assigned a corresponding position 530 in the BTI 528. In an aspect, the BTI 528 can comprise a hash for each unique attribute. The BTI 528 can comprise a column 531 for each row of Table 1. For each attribute, a "1" can indicate the presence of the attribute in the row and a "0" can indicate an absence of the attribute from the row. "0" and "1" are merely examples of values used to indicate presence or absence. Thus, the BTI 528 reflects that the attribute "Soap" is found in row 1 of Table 1, the attribute "Soft Soap" is found in row 2 of Table 1, and the attribute "Toothpaste" is found in rows 3 and 4 of Table 1.

By way of example, the inverted index 529 can be generated such that each position in the inverted index 529 corresponds to a row of Table 1 (e.g., first position corresponds to row 1, second position corresponds to row 2, etc. . . . ). A value can be entered into each position that reflects the corresponding position 530 for each attribute. Thus, in the inverted index 529, position 1 comprises the value "1" which is the corresponding position 530 value for the attribute "Soap", position 2 comprises the value "2" which is the corresponding position 530 value for the attribute "Soft Soap", position 3 comprises the value "3" which is the corresponding position 530 value for the attribute "Toothpaste", and position 4 comprises the value "3" which is the corresponding position 530 value for the attribute "Toothpaste".

By way of example, a BAI 532 can be generated as an index between the product attribute of Table 2 and Table 1. The BAI 532 can comprise a row for each unique attribute in the BTI 524 by order of corresponding position 526. The value in each row can comprise the corresponding position 530 of the BTI 528. Thus, position 1 of the BAI 532 corresponds to "Toothpaste" in the BTI 524 (corresponding position 526 of 1) and comprises the value "3" which is the corresponding position 530 for "Toothpaste" of the BTI 528. Position 2 of the BAI 532 corresponds to "Soap" in the BTI 524 (corresponding position 526 of 2) and comprises the value "1" which is the corresponding position 530 for "Soap" of the BTI 528. Position 3 of the BAI 532 corresponds to "Shampoo" in the BTI 524 (corresponding position 526 of 3) and comprises the value "−1" which indicates that the attribute "Shampoo" is not found in Table 1.

By way of example, a BAI 533 can be created to create an index between the product attribute of Table 1 and Table 2. The BAI 533 can comprise a row for each unique attribute in the BTI 528 by order of corresponding position 530. The value in each row can comprise the corresponding position 526 of the BTI 524. Thus, position 1 of the BAI 533 corresponds to "Soap" in the BTI 528 (corresponding position 530 of 1) and comprises the value "2" which is the corresponding position 526 for "Soap" of the BTI 524. Position 2 of the BAI 533 corresponds to "Soft Soap" in the BTI 528 (corresponding position 530 of 2) and comprises the value "−1" which indicates that the attribute "Soft Soap" is not found in Table 2. Position 3 of the BAI 533 corresponds to "Toothpaste" in the BTI 528 (corresponding position 530 of 3) and comprises the value "1" which is the corresponding position 526 for "Toothpaste" of the BTI 524.

FIG. 5E illustrates an example application of the logical inference engine 106 utilizing the BTI 520, the BTI 524, and the BTI 528. A user can select the "Client" "Kalle" from within a user interface. A column for a user selection 534 of "Kalle" can be indicated in the BTI 520 comprising a value for each attribute that reflects the selection status of the attribute. Thus, the user selection 534 comprises a value of "0" for the attribute "Nisse" indicating that "Nisse" is not selected, the user selection 534 comprises a value of "0" for the attribute "Gullan" indicating that "Gullan" is not selected, the user selection 534 comprises a value of "1" for the attribute "Kalle" indicating that "Kalle" is selected, and the user selection 534 comprises a value of "0" for the attribute "Pekka" indicating that "Pekka" is not selected.

The BTI 520 can be consulted to determine that the attribute "Kalle" has a value of "1" in the column 523 corresponding to rows 3 and 4. In an aspect, the inverted index 521 can be consulted to determine that the user selection 534 relates to the position 522 value of "3" which is found in the inverted index 521 at positions 3 and 4, implicating rows 3 and 4 of Table 1. Following path 535, a row state 536 can be generated to reflect the user selection 534 as applied to the rows of Table 2. The row state 536 can comprise a position that corresponds to each row and a value in each position reflecting whether a row was selected. Thus, position 1 of the row state 536 comprises the value "0" indicating that row 1 does not contain "Kalle", position 2 of the row state 536 comprises the value "0" indicating that row 2 does not contain "Kalle", position 3 of the row state 536 comprises the value "1" indicating that row 3 does contain "Kalle", position 4 of the row state 536 comprises the value "1" indicating that row 4 does contain "Kalle", position 5 of the row state 536 comprises the value "0" indicating that row 5 does not contain "Kalle", and position 6 of the row state 536 comprises the value "0" indicating that row 6 does not contain "Kalle".

Following path 537, the row state 536 can be compared with the inverted index 525 to determine the corresponding position 526 contained in the inverted index 525 at positions 3 and 4. The inverted index 525 comprises the corresponding position 526 value of "2" in position 3 and the corresponding position 526 value of "3" in position 4. Following path 538, the corresponding position 526 values of "2" and "3" can be determined to correspond to "Soap" and "Shampoo" respectively in the BTI 524. Thus, the logical inference engine 106 can determine that both "Soap" and "Shampoo" in Table 2 are associated with "Kalle" in Table 2. The association can be reflected in an inferred state 539 in the BTI 524. The inferred state 539 can comprise a column with a row for each attribute in the BTI 524. The column can comprise a value indicated the selection state for each attribute. The inferred state 539 comprises a "0" for "Toothpaste" indicating that "Toothpaste" is not associated with "Kalle", the inferred state 539 comprises a "1" for "Soap" indicating that "Soap" is associated with "Kalle", and inferred state 539 comprises a "1" for "Shampoo" indicating that "Shampoo" is associated with "Kalle".

Following path 540, the inferred state 539 can be compared to the BAI 532 to determine one or more associations between the selection of "Kalle" in Table 2 and one or more attributes in Table 1. As the inferred state 539 comprises a value of "1" in both position 2 and position 3, the BAI 532 can be assessed to determine the values contained in position 2 and position 3 of the BAI 532 (following path 541). Position 2 of the BAI 532 comprises the value "1" which identifies the corresponding position 530 of "Soap" and position 3 of the BAI 532 comprises the value "−1" which indicates that Table 1 does not contain "Shampoo". Thus, the logical inference engine 106 can determine that "Soap" in Table 1 is associated with "Kalle" in Table 2. The association can be reflected in an inferred state 542 in the BTI 528. The inferred state 542 can comprise a column with a row for each attribute in the BTI 528. The column can comprise a value indicated the selection state for each attribute. The inferred state 542 comprises a "1" for "Soap" indicating that "Soap" is associated with "Kalle", the inferred state 542 comprises a "0" for "Soft Soap" indicating that "Soft Soap" is not associated with "Kalle", and the inferred state 542 comprises a "0" for "Toothpaste" indicating that "Toothpaste" is not associated with "Kalle". Based on the current state of BTIs and BAIs, if the data sources 102 indicate that an update or delta change has occurred to the underlying data, the BTIs and BAIs can be updated with corresponding changes to maintain consistency.

In aspects implementing indexlets, the logical inference engine 106 can apply query language by first performing intra-table inferencing on respective tables. Intra-table inferencing comprises transferring the imposed state of one field to other fields within the same table. In an aspect, intra-table inferencing can comprise computing the union of the index of the active attributes in a user input 504. The intersection of the result of the union operation and record states (i.e. row states 510) is then determined. This result is then intersected with the attribute states 514 of other columns using the inverted index 512. If other selection vectors from a previously provided user input vector 504 has zero active entries, a conflict can be detected. In an aspect, the logical inference engine 106 can resolve the detected conflict. In an aspect, resolving a conflict can include deleting or otherwise eliminating one or more incompatible selections. In another aspect, resolving a conflict can include reverting the data model 501 or a portion of the data model 501, e.g. a table, record, or attribute, to a previous state.

Figure 5G:
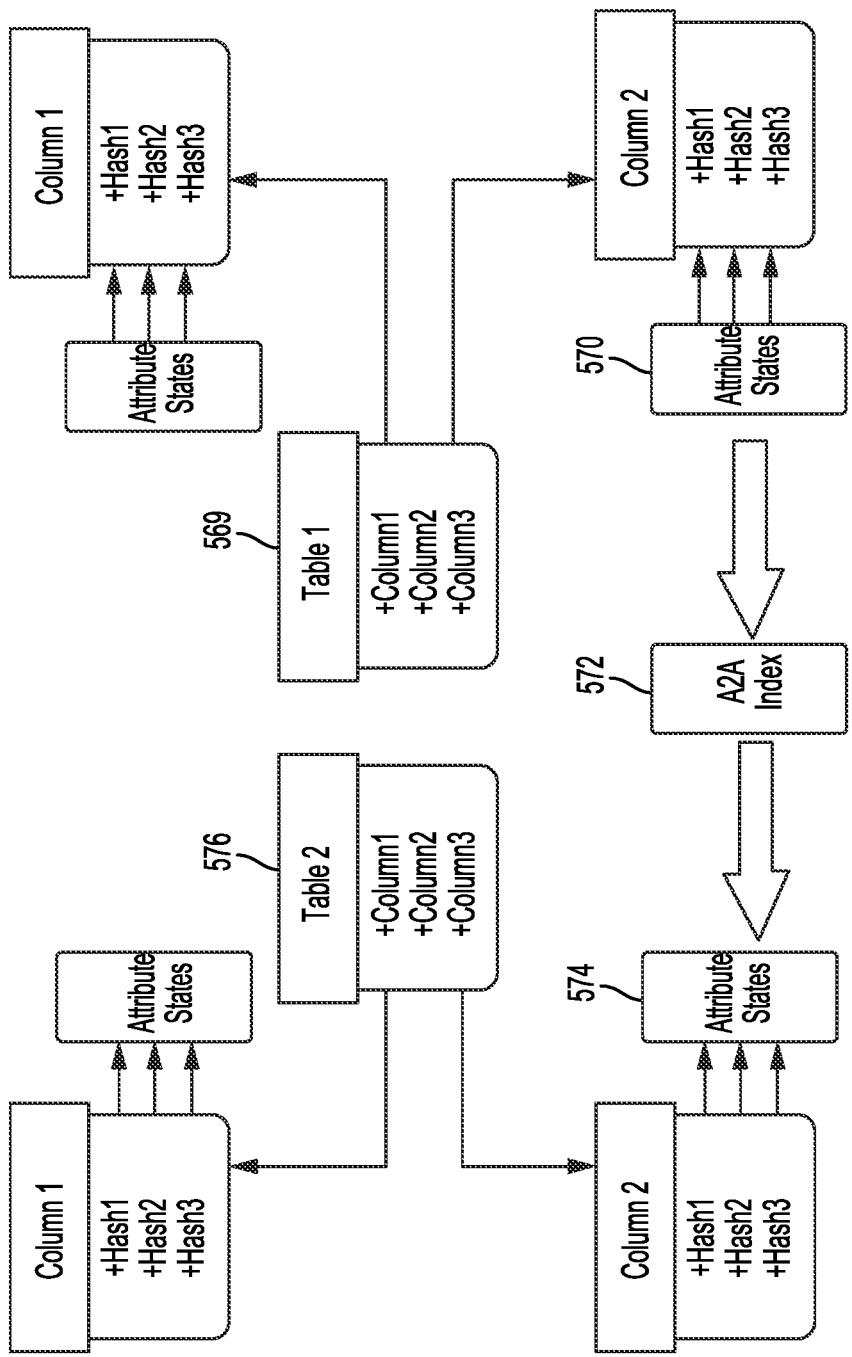
FIG. 5G illustrates an example of inter-table inferencing using indexlets.
Figure 5H:
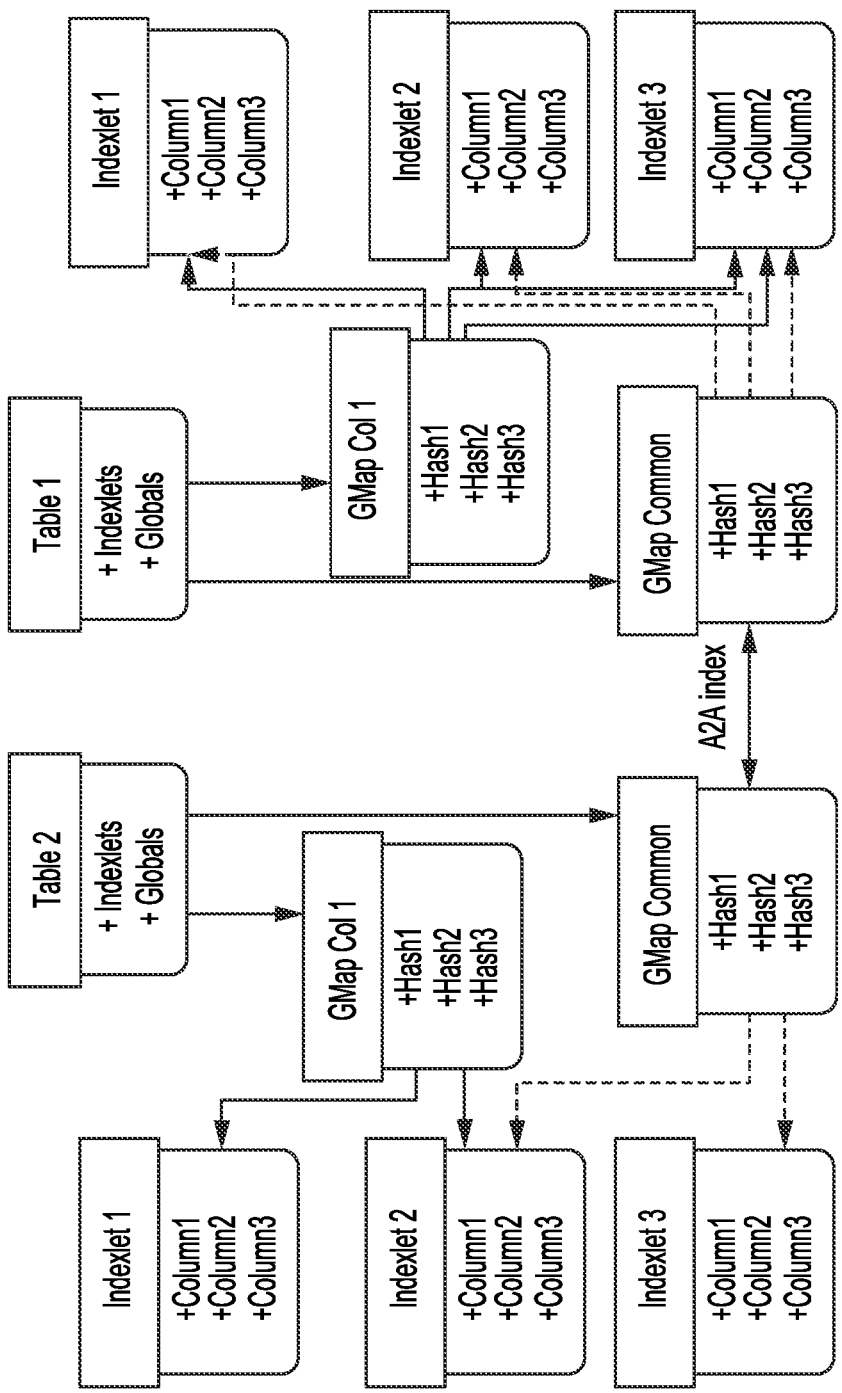
FIG. 5H illustrates an example of linking indexlets of different tables.

In an aspect, after performing intra-table inferencing, the logical inference engine 106 can perform inter-table inferencing based on the intra-table inferencing output of a plurality of tables, as is depicted in FIG. 5G. In an aspect, intra-table inferencing can include transferring a common field attribute of one table 569 to a child in its branch. In an aspect, this can be performed by running the attribute states 570 output from intra-table inferencing through an attribute-to-attribute (A2A) index 572 referencing the attribute states 574 in a second table 576. In an aspect, the A2A index 572 can be partitioned into one or more indexlets as described herein with respect to other data tables. In another aspect, transferring a common field attribute of one table 569 to a child in its branch by running the attribute states 570 output from intra-table inferencing through a function or logic performing similar functionality as the A2A index 572. For example, a function, service, or other logic can accept as input a pair of symbols and return an indication of whether or not they are related, e.g. TRUE or FALSE. In another aspect, attribute-to-attribute relations can be indicated by user input.

Based on current selections and possible rows in data tables a calculation/chart engine 108 can calculate aggregations in objects forming transient hyper cubes in an application. The calculation/chart engine 108 can further build a virtual temporary table from which aggregations can be made. The calculation/chart engine 108 can perform a calculation (e.g., evaluate an expression in response to a user selection/de-selection) via a multithreaded operation. The state space can be queried to gather all of the combinations of dimensions and values necessary to perform the calculation. In an aspect, the query can be on one thread per object, one process, one worker, combinations thereof, and the like. The expression can be calculated on multiple threads per object. Results of the calculation can be passed to a rendering engine 116 and/or optionally to an extension engine 110.

Figure 5I:
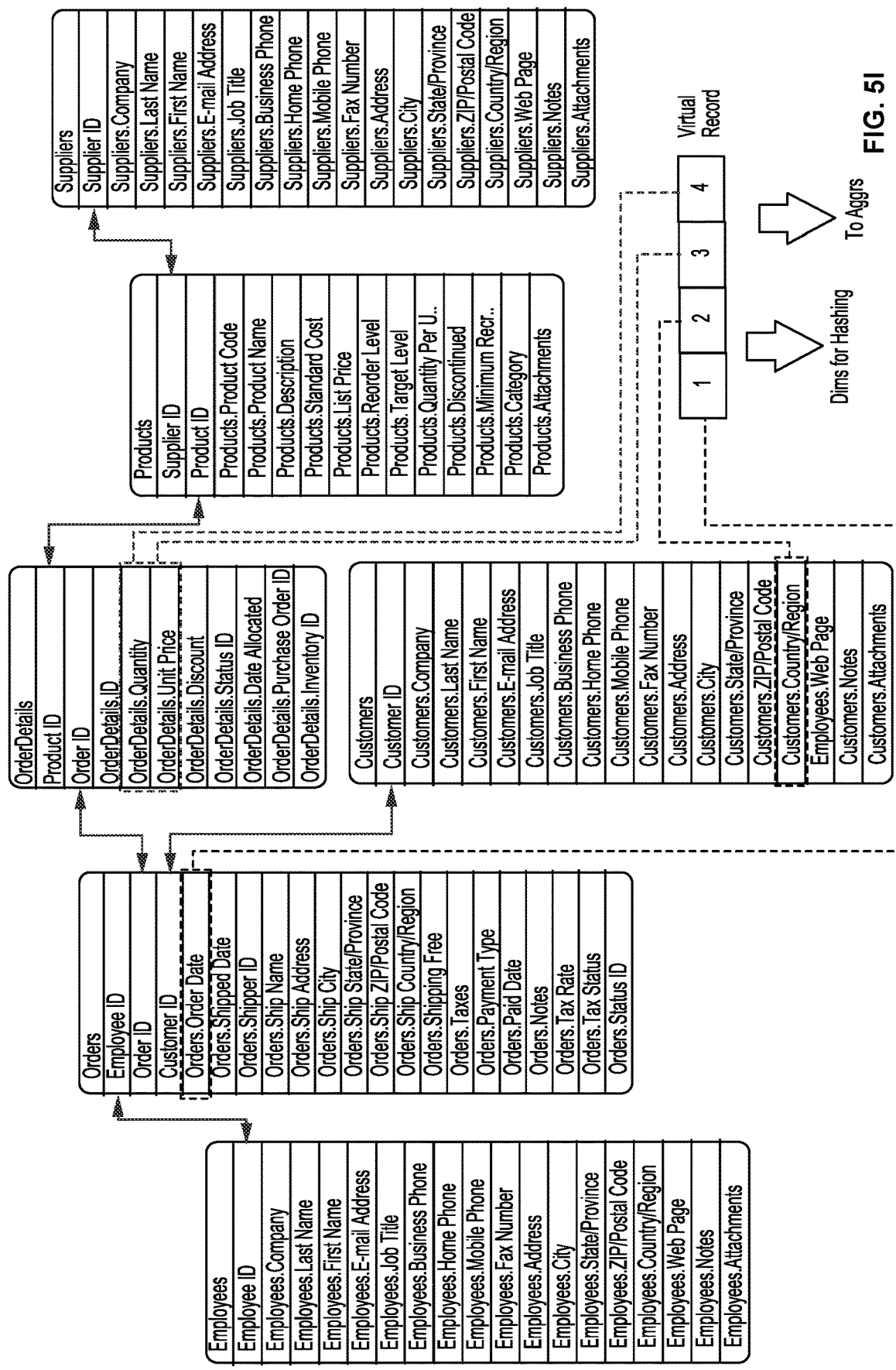
FIG. 5I illustrates an example virtual record.

In an aspect, the chart engine 108 can receive dimensions, expressions, and sorting parameters and can compute a hypercube data structure containing aggregations along the dimensions. For example, a virtual record can be built with a placeholder for all field values (or indices) needed, as a latch memory location. When all values are assigned, the virtual record can be processed to aggregate the fields needed for computations and save the dimension values in a data structure per row of the resulting hypercube. In such a way, the traversal of the database can be done in an arbitrary way, just depending on requirements provided by memory consumption and indexing techniques used for the particular case at hand. An example virtual record is shown in FIG. 5I. This example considers the dimensions Order Date and Country/Region and the expression sum(Unit Price*Quantity).

Figure 5J:
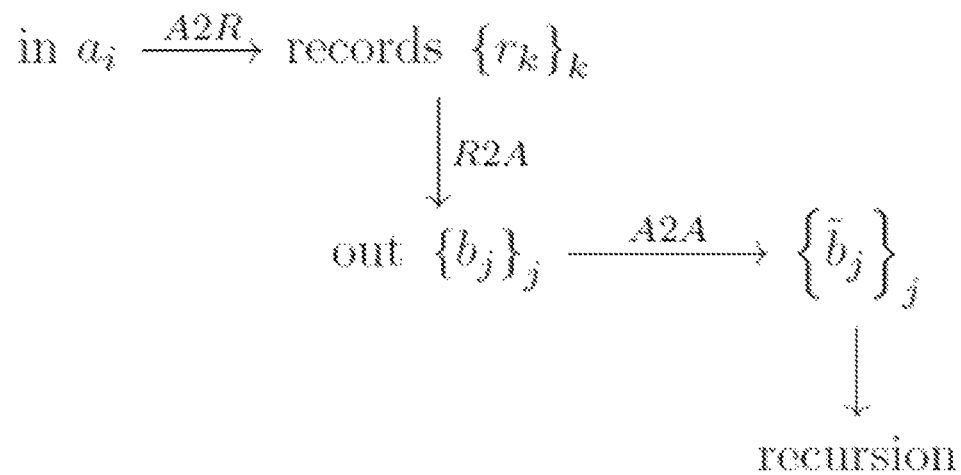
FIG. 5J illustrates an example method for database traversals.

The chart engine 108 can use indices to build hypercube domains. For example, using bidirectional indexing, walking the database for traversals can be performed as shown in FIG. 5J. A recursion algorithm starts with a consistently computed state. A "forest" covering the data model can be constructed and the "roots" of the "trees" can be either the largest table in the tree or one table containing the first needed field. Starting from that point, the database can be (naively) traversed as follows. Initially, virtual record fields present in the current table can be checked and saved in a list of local fields. An active attribute a can be taken from the input field (e.g., iteratively). Using the A2R index, the record set $\{r_k\}_k$ associated to that symbol can be identified. The chart engine 108 can assign for every $r_k$, the virtual record entries present in the local field list. If the virtual record is totally assigned, the virtual record can be processed. The chart engine 108 can go to next symbol. Using R2S on the output field, the chart engine 108 can find corresponding attribute $b_j$. Using the A2A index, the chart engine 108 can translate $b_j$ to the next-in-branch table $\tilde{b}_j$. The chart engine 108 can then perform this same process with $\tilde{b}_j$ as input. While the preceding operations are on the global symbol maps, the impact on respective indexlets is included in the scheduling planning. Parallelisation of hypercube traversal is also possible for common aggregation linear operators, as described below.

The hypercube domain can be paged. The traversal can be stopped at any point by saving the state defined in the virtual record, and the tables being traversed at that point.

Expressions are strings representing which operations to be done on fields from the database. So, consider the field set $S=\{S_0, S_1, S_2, \ldots, S_n\}$ of the database. This is the union of all possible attributes per column, and those associated are included within the same set under a unique symbol. The part of an expression that is the subset of $\hat{S} \subset S$ can be used for computing the values. Furthermore, the property of globality of the expression, e.g., the expression requiring all records to be available, can be taken into account when evaluating the expression.

Provided herein is a hypercube taxonomy. Two attributes $x_i \in S_i$, $x_j \in S_j$ can be defined as associated if the inference engine 106 can create a connected path between the attributes. Such can be denoted as $x_i \sim x_j$. Consider the space of virtual records on $\hat{S} \subset S$ as $$R_v^{\hat{S}} = \{r = (x_1, x_2, \ldots, x_n) | x_i \in S_i, x_i \sim x_j \forall i, j\}$$

Subsequently, the dimension set can be defined as $$Dim = R_v^{\hat{S}}$$

where $\hat{S}$ is the set of dimensions defined to compute the hypercube. This set is naturally provided with an enumeration of all its elements where i is mapped to a unique element, denoted by $Dim^i$. Furthermore, provided some expression and its corresponding computation set $\tilde{s}$, the hypercube domain can be defined as $$X = R_v^{(S, \hat{S})}$$

X has a natural partition $$X = \bigcup_i X_i, X_i = \{r \in X \mid x_j = Dim^i(j), j = 0, \ldots, k\}$$

The hypercube problem can then be formulated as follows. Consider Dim and X together with $I: X^k \to \mathcal{R}^k$, $F: \mathcal{R}^n \to \mathcal{R}^p$ with p=#(X). the problem becomes computing $$(F \circ I)(X) = \sum_i (f_i \circ I)(X) e_i$$

with $e_i$ the canonical vector with just 1 in i-th position, from the data model as quickly as possible. The hypercube problems can now be classified according to the characteristics of the expressions and the record domains. Some cases are inherently dependent of each other while others are parallelisable. Classifications include, for example, a component independent operator:

$$(F \circ I)(X) = \sum_i (f \circ I)(X_i) e_i;$$

a summable operator:

$$(F \circ I)(X) = \sum_i \sum_{x \in X_i} (f \circ I)(\{x\}) e_i;$$

and
a recursive operator:

$$(f_{i+1} \circ I)(X) = g\left(X_{i+1}, \sum_{j=0}^{i} (f_j \circ I)(X_j)\right).$$

This algebra works with strings, if string concatenation is regarded as sum.

The objective can be to minimize I/O by grouping results by indexlet, and distributing the work accordingly. The workload can be distributed considering the partition $X_i$. Without loss of generality, the component independent operator approach is disclosed and along with related load distribution.

In an aspect, the chart engine 108 can utilize indexlets for parallelization (e.g., distributing computations). The chart engine 108 can determine one or more aggregation functions $(\hat{S})$ and one or more internal functions (e.g., scalar functions) using indexlets. In an example where an aggregation function is to be determined with respect to a single table (e.g., when fields in $\hat{S}$ belong to the same table) is disclosed. For the partition the disclosed methods can determine a subset $\hat{X} \subset \{X_i\}$ that belongs to an indexlet $Idx_k$. A query can be made with the respective partition in parallel for the set of all indexlets $\{Idx_k\}_k$. Results can be aggregated at a top level when all queries are returned. The primary computational overhead comes from data transmission in this case of all partitions as the query is executed for every indexlet and results returned.

Figure 5K:
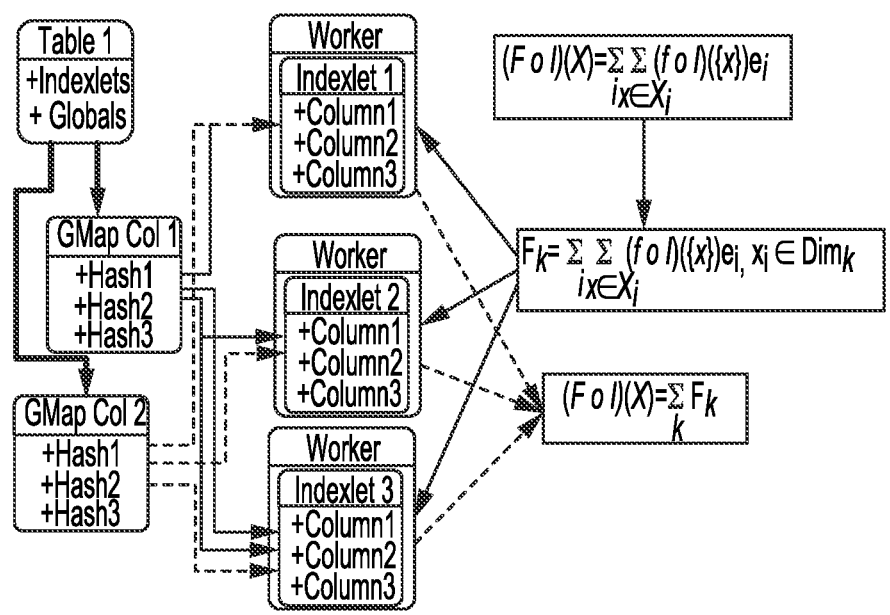
FIG. 5K illustrates load distribution in a single table case.

As shown in FIG. 5K, the chart engine 108 can perform the following example method in the case of $\hat{S}$ being contained within a single table. The chart engine 108 can determine $Dim^i$. The chart engine 108 can annotate which indexlets are needed per $Dim^i$. The chart engine 108 can regroup $Dim^i$ per indexlet $Idx_k$. The chart engine 108 assigns to every indexlet a subset $Dim_k \subset Dim$. The chart engine 108 can take $\hat{f}$ as f if the function is summable and domain independent, or its approximation $\tilde{f}$ if not. The chart engine 108 can loop in k: query (in parallel) every indexlet $Idx_k$ with $\hat{f} \circ I$ partitioned by $Dim_k$. For example, by computing:

$$F_k = \sum_i \sum_{x \in X_i} (f \circ I)(\{x\}) e_i, X_i \in Dim_k$$

The chart engine 108 can aggregate at top level as a last pass. For example, by computing:

$$(F \circ I)(X) = \sum_k F_k$$

Thus, the chart engine 108 can introduce a clear parallel pattern by every subcomputation on indexlets.

Figure 5L:
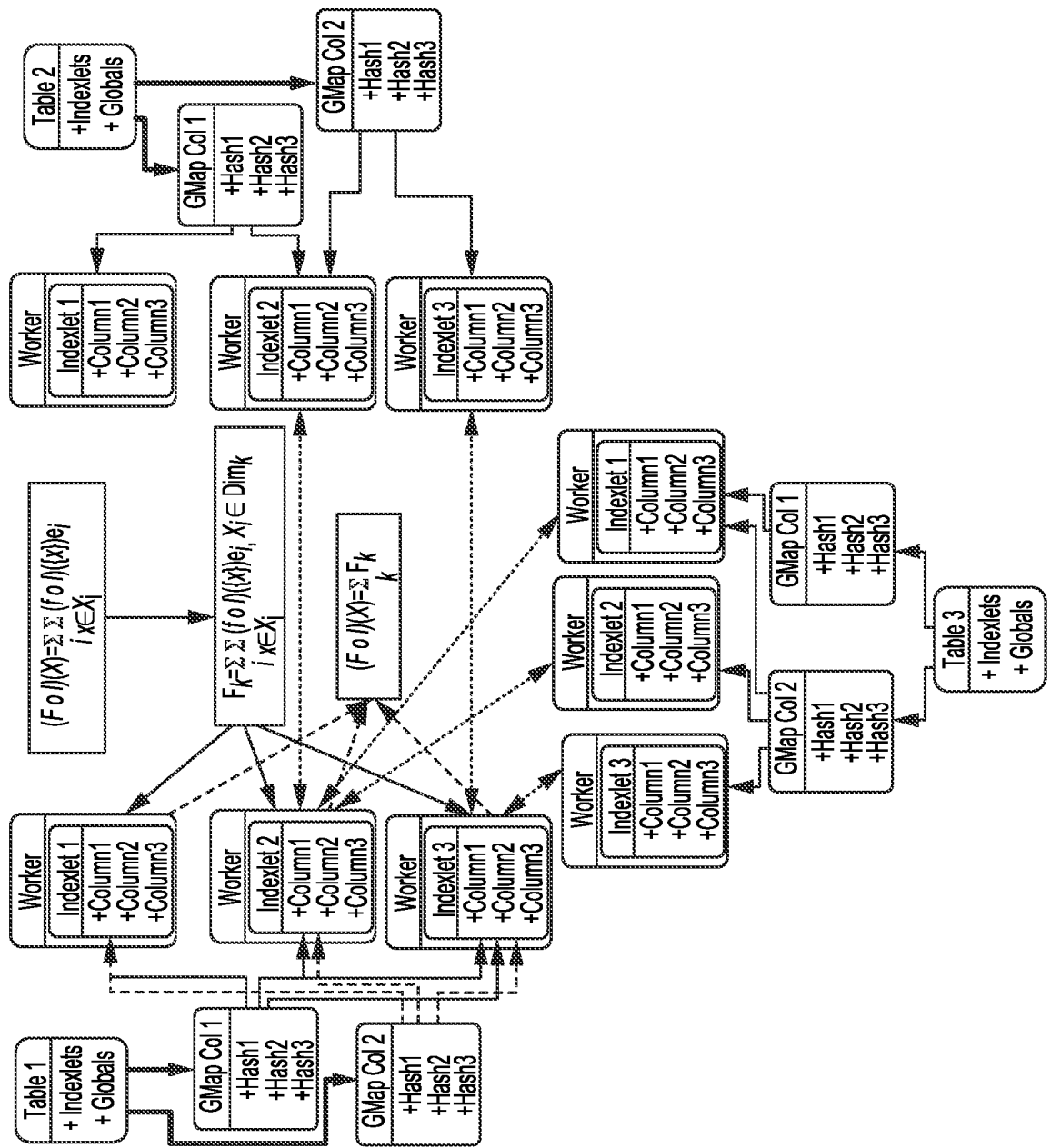
FIG. 5L illustrates load distribution in a multiple table case.

As shown in FIG. 5L, the chart engine 108 can perform the following example method in the case of $\hat{S}$ being contained within multiple tables. In the multiple table case, the computational overhead is found in constructing virtual records in parallel. The chart engine 108 can determine Dim. The chart engine 108 can annotate which indexlets in all tables are needed per $Dim^{i,j}$. The chart engine 108 can regroup $Dim^i$ per indexlet $Idx_k^i$ and table $T_j$. The chart engine 108 thus assigns a subset $Dim_k \subset Dim$ to every indexlet in every table. The chart engine 108 can identify the table with the largest number of indexlets as a distributed master table. The chart engine 108 can pass the expression to compute as tasks to all the indexlets of the master table, and all other tables involved prepare the domain pieces imposed by the partitions $Dim_k^j$. The chart engine 108 can utilize the master table indexlets to query the other indexlets in the closest neighbors indexlets. If the closest neighbors indexlets need further pieces to complete their domains, they ask downstream to their respective dependencies. Every indexlet of the master table then completes the computation of $F_k$. The chart engine 108 can aggregate at top level as a last pass. For example, by computing:

$$(F \circ I)(X) = \sum_k F_k$$

The chart engine 108 thus distributes a hypercube domain across nodes by using the largest table to compute the domain and maximize I/O.

In the event of a data update the underlying data source/data set, a new indexlet can be generated as described above and the new indexlet incorporated into the methods for evaluating an expression (single table or multiple data). A data update can include a modification to existing data and/or appending new data to existing data (e.g., adding data to an existing table or adding a new table of data). Thus, the methods for evaluating an expression shown in FIG. 5K and FIG. 5L enables the system to use the new indexlet (and any existing indexlets as needed) to evaluate an expression, thus avoiding the need to recreate the hypercube/multidimensional cube.

Figure 5M:
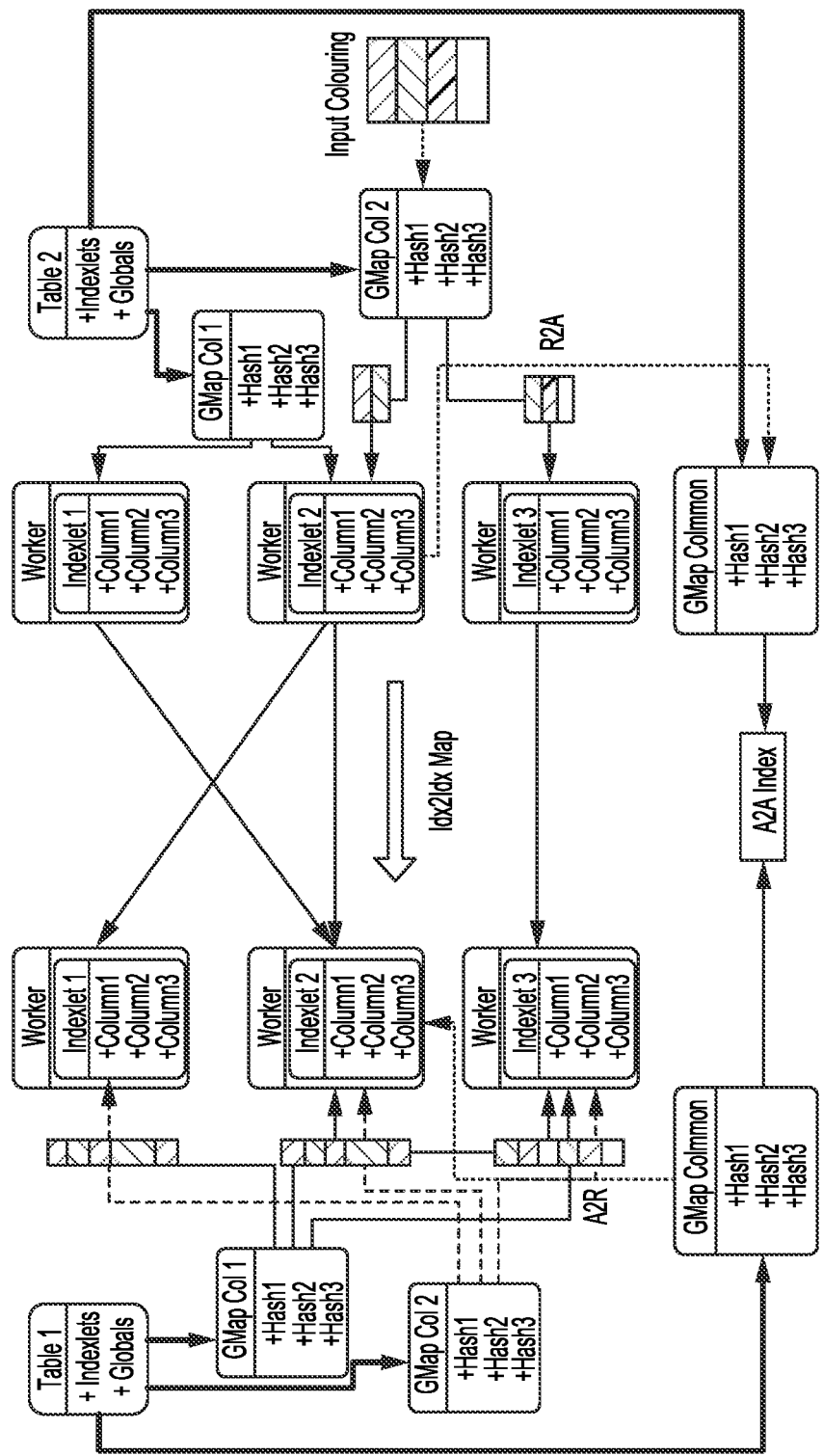
FIG. 5M illustrates 121 mapping.

In an aspect, the chart engine 108 can distribute hypercube domain computation. For example, by finding the partitions of each indexlet per dimensions prescribed. The basic case is given when considering two adjacent tables are associated. The chart engine 108 can utilize an indexlet centric technique instead of a symbol centric technique. The symbol centric traversal is done intra-indexlet. The indexlet centric technique is depicted in FIG. 5M.

The mapping is from indexlet to indexlet in order to establish partitions from symbols to other symbols. This partition can be pre-computed and stored when constructing the A2A map. During the construction of the A2A map, the construction of the I2I map can be performed. The map can be constructed as I2I: N→N where k is associated to j if the indexlet $Idx_a^k$ of table a is associated to indexlet $Idx_b^j$ of table b. Such a coarse mapping can be used then to label the records of indexlet $Idx_a^k$ by the records of $Idx_b^j$ or the symbols of the common dimension of A2A. This can be computed and stored at indexing time for A2A.

Labeling and/or coloring can be distributed per indexlet, collapsing in the resulting indexlets, and then retransmitted to the next table using the I2I map. By way of example, the chart engine 108 can label all active symbols of the dimensions involved and can select the largest table (as measured by number of indexlets) with a column in Ŝ as a root table. The chart engine 108 can transport the labels using the 121 map to the root table from all tables as shown in FIG. 5M. The result is that the different combinations of labels are then conforming every $Dim_k$. In the case of multiple tables, the chart engine 108 can further propagate the domains to spoke tables, considering the root table as a hub.

xxx

Optionally, the extension engine 110 can be implemented to communicate data via an interface 112 to an external engine 114. In another aspect, the extension engine 110 can communicate data, metadata, a script, a reference to one or more artificial neural networks (ANNs), one or more commands to be executed, one or more expressions to be evaluated, combinations thereof, and the like to the external engine 114. The interface 114 can comprise, for example, an Application Programming Interface (API). The external engine 114 can comprise one or more data processing applications (e.g., simulation applications, statistical applications, mathematical computation applications, database applications, combinations thereof, and the like). The external engine 114 can be, for example, one or more of MATLAB®, R, Maple®, Mathematica®, combinations thereof, and the like.

In an aspect, the external engine 114 can be local to the associative data indexing engine 100 or the external engine 114 can be remote from the associative data indexing engine 100. The external engine 114 can perform additional calculations and transmit the results to the extension engine 110 via the interface 112. A user can make a selection in the data model of data to be sent to the external engine 114. The logical inference engine 106 and/or the extension engine 110 can generate data to be output to the external engine 114 in a format to which the external engine 114 is accustomed to processing. In an example application, tuples forming a hypercube can comprise two dimensions and one expression, such as (Month, Year, Count (ID)), ID being a record identification of one entry. Then said tuples can be exchanged with the external engine 114 through the interface 112 as a table. If the data comprise births there can be timestamps of the births and these can be stored as month and year. If a selection in the data model will give a set of month-year values that are to be sent out to an external unit, the logical inference engine 106 and/or the extension engine 110 can ripple that change to the data model associatively and produce the data (e.g., set and/or values) that the external engine 114 needs to work with. The set and/or values can be exchanged through the interface 112 with the external engine 114. The external engine 114 can comprise any method and/or system for performing an operation on the set and/or values. In an aspect, operations on the set and/or values by the external engine 114 can be based on tuples (aggregated or not). In an aspect, operations on the set and/or values by the external engine 114 can comprise a database query based on the tuples. Operations on the set and/or values by the external engine 114 can be any transformation/operation of the data as long as the cardinality of the result is consonant to the sent tuples/hypercube result.

In an aspect, tuples that are transmitted to the external engine 114 through the interface 112 can result in different data being received from the external engine 114 through the interface 112. For example, a tuple consisting of (Month, Year, Count (ID)) should return as 1-to-1, m-to-1 (where aggregations are computed externally) or n-to-n values. If data received are not what were expected, association can be lost. Transformation of data by the external engine 114 can be configured such that cardinality of the results is consonant to the sent tuples and/or hypercube results. The amount of values returned can thus preserve associativity.

Results received by the extension engine 110 from the external engine 114 can be appended to the data model. In an aspect, the data can be appended to the data model without intervention of the script engine 104. Data model enrichment is thus possible "on the fly." A natural work flow is available allowing clicking users to associatively extend the data. The methods and systems disclosed permit incorporation of user implemented functionality into a presently used work flow. Interaction with third party complex computation engines, such as MATLAB® or R, is thus facilitated.

The logical inference engine 106 can couple associated results to the external engine 114 within the context of an already processed data model. The context can comprise tuple or tuples defined by dimensions and expressions computed by hypercube routines. Association is used for determination of which elements of the present data model are relevant for the computation at hand. Feedback from the external engine 114 can be used for further inference inside the inference engine or to provide feedback to the user.

A rendering engine 116 can produce a desired graphical object (charts, tables, etc) based on selections/calculations. When a selection is made on a rendered object there can be a repetition of the process of moving through one or more of the logical inference engine 106, the calculation/chart engine 108, the extension engine 110, the external engine 114, and/or the rendering engine 116. The user can explore the scope by making different selections, by clicking on graphical objects to select variables, which causes the graphical object to change. At every time instant during the exploration, there exists a current state space, which is associated with a current selection state that is operated on the scope (which always remains the same).

Different export features or tools 118 can be used to publish, export or deploy any output of the associative data indexing engine 100. Such output can be any form of visual representation, including, but not limited to, textual, graphical, animation, audio, tactile, and the like.

An example database, as shown in FIG. 2, can comprise a number of data tables (Tables 1-5). Each data table can contain data values of a number of data variables. For example, in Table 1 each data record contains data values of the data variables "Product," "Price," and "Part." If there is no specific value in a field of the data record, this field is considered to hold a NULL-value. Similarly, in Table 2 each data record contains values of the variables "Date," "Client," "Product," and "Number." In Table 3 each data record contains values of variable "Date" as "Year," "Month" and "Day." In Table 4 each data record contains values of variables "Client" and "Country," and in Table 5 each data record contains values of variables "Country," "Capital," and "Population." Typically, the data values are stored in the form of ASCII-coded strings, but can be stored in any form.

Figure 3:
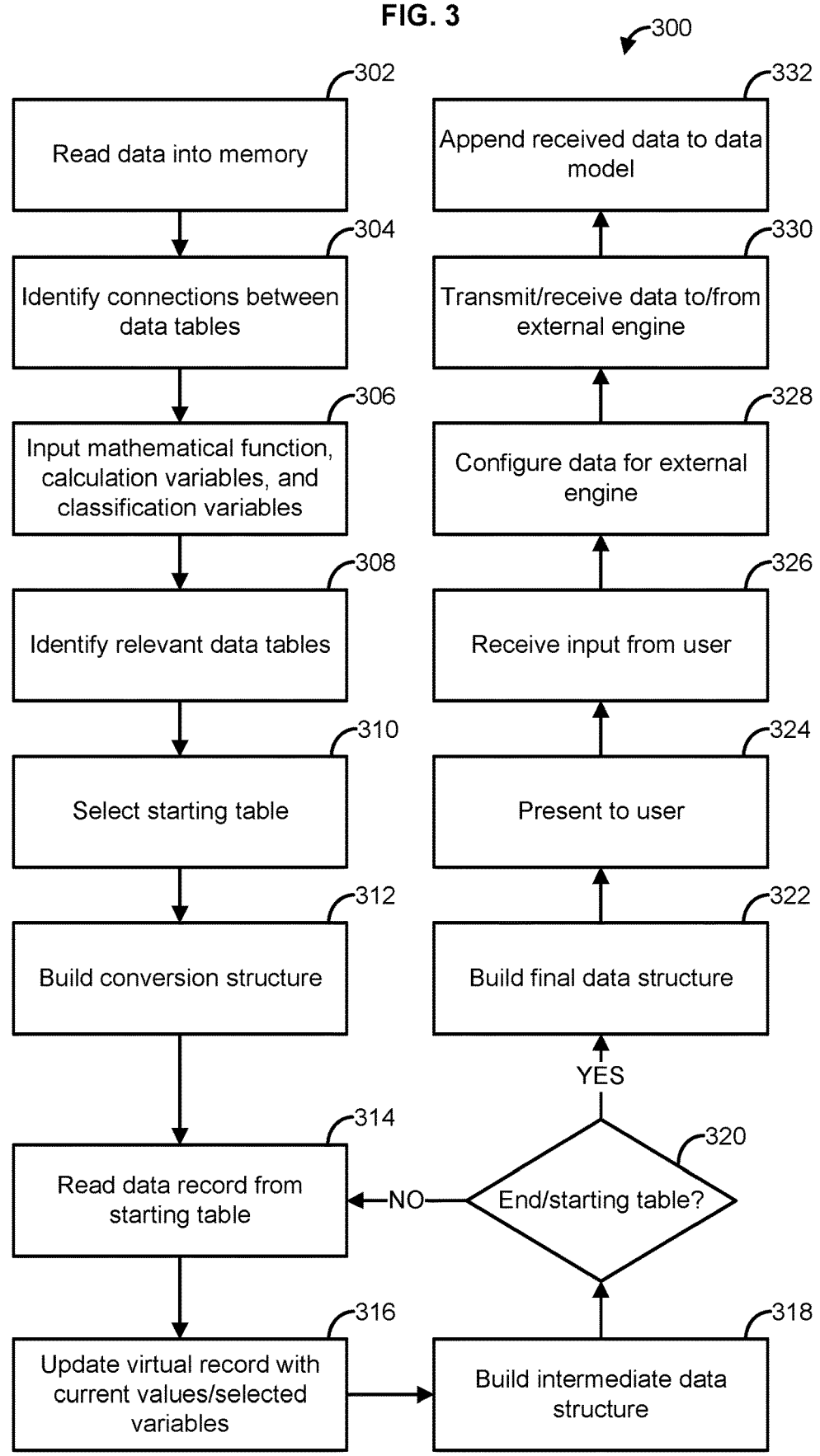
FIG. 3 is a schematic flowchart showing basic steps performed when extracting information from a database.

The methods provided can be implemented by means of a computer program as illustrated in a flowchart of a method 300 in FIG. 3. In a step 302, the program can read some or all data records in the database, for instance using a SELECT statement which selects all the tables of the database, e.g. Tables 1-5. In an aspect, the database can be read into primary memory of a computer.

To increase evaluation speed, each unique value of each data variable in said database can be assigned a different binary code and the data records can be stored in binary-coded form. This can be performed, for example, when the program first reads the data records from the database. For each input table, the following steps can be carried out. The column names, e.g. the variables, of the table can be read (e.g., successively). Every time a new data variable appears, a data structure can be instantiated for the new data variable. An internal table structure can be instantiated to contain some or all the data records in binary form, whereupon the data records can be read (e.g., successively) and binary-coded. For each data value, the data structure of the corresponding data variable can be checked to establish if the value has previously been assigned a binary code. If so, that binary code can be inserted in the proper place in the above-mentioned table structure. If not, the data value can be added to the data structure and assigned a new binary code, for example the next binary code in ascending order, before being inserted in the table structure. In other words, for each data variable, a unique binary code can be assigned to each unique data value.

After having read some or all data records in the database, the method 300 can analyze the database in a step 304 to identify all connections between the data tables. A connection between two data tables means that these data tables have one variable in common. In an aspect, step 304 can comprise generation of one or more bidirectional table indexes and one or more bidirectional associative indexes. In an aspect, generation of one or more bidirectional table indexes and one or more bidirectional associative indexes can comprise a separate step. In another aspect, generation of one or more bidirectional table indexes and one or more bidirectional associative indexes can be on demand. After the analysis, all data tables are virtually connected. In FIG. 2, such virtual connections are illustrated by double ended arrows. The virtually connected data tables can form at least one so-called "snowflake structure," a branching data structure in which there is one and only one connecting path between any two data tables in the database. Thus, a snowflake structure does not contain any loops. If loops do occur among the virtually connected data tables, e.g. if two tables have more than one variable in common, a snowflake structure can in some cases still be formed by means of special algorithms known in the art for resolving such loops.

After this initial analysis, the user can explore the database. In doing so, the user defines in step 306 a mathematical function, which could be a combination of mathematical expressions. Assume that the user wants to extract the total sales per year and client from the database in FIG. 2. The user defines a corresponding mathematical function "SUM (x*y)", and selects the calculation variables to be included in this function: "Price" and "Number." The user also selects the classification variables: "Client" and "Year."

The method 300 then identifies in step 308 all relevant data tables, e.g. all data tables containing any one of the selected calculation and classification variables, such data tables being denoted boundary tables, as well as intermediate data tables in the connecting path(s) between these boundary tables in the snowflake structure, such data tables being denoted connecting tables. There are no connecting tables in the present example. In an aspect, one or more bidirectional table indexes and one or more bidirectional associative indexes can be accessed as part of step 308.

In the present example, all occurrences of every value, e.g. frequency data, of the selected calculation variables can be included for evaluation of the mathematical function. In FIG. 2, the selected variables ("Price," "Number") can require such frequency data. Now, a subset (B) can be defined that includes all boundary tables (Tables 1-2) containing such calculation variables and any connecting tables between such boundary tables in the snowflake structure. It should be noted that the frequency requirement of a particular variable is determined by the mathematical expression in which it is included. Determination of an average or a median calls for frequency information. In general, the same is true for determination of a sum, whereas determination of a maximum or a minimum does not require frequency data of the calculation variables. It can also be noted that classification variables in general do not require frequency data.

Then, a starting table can be selected in step 310, for example, among the data tables within subset (B). In an aspect, the starting table can be the data table with the largest number of data records in this subset. In FIG. 2, Table 2 can be selected as the starting table. Thus, the starting table contains selected variables ("Client," "Number"), and connecting variables ("Date," "Product"). These connecting variables link the starting table (Table 2) to the boundary tables (Tables 1 and 3).

Thereafter, a conversion structure can be built in step 312. This conversion structure can be used for translating each value of each connecting variable ("Date," "Product") in the starting table (Table 2) into a value of a corresponding selected variable ("Year," "Price") in the boundary tables (Table 3 and 1, respectively). A table of the conversion structure can be built by successively reading data records of Table 3 and creating a link between each unique value of the connecting variable ("Date") and a corresponding value of the selected variable ("Year"). It can be noted that there is no link from value 4 ("Date: 1999 Jan. 12"), since this value is not included in the boundary table. Similarly, a further table of the conversion structure can be built by successively reading data records of Table 1 and creating a link between each unique value of the connecting variable ("Product") and a corresponding value of the selected variable ("Price"). In this example, value 2 ("Product: Toothpaste") is linked to two values of the selected variable ("Price: 6.5"), since this connection occurs twice in the boundary table. Thus, frequency data can be included in the conversion structure. Also note that there is no link from value 3 ("Product: Shampoo").

When the conversion structure has been built, a virtual data record can be created. Such a virtual data record accommodates all selected variables ("Client," "Year," "Price," "Number") in the database. In building the virtual data record, a data record is read in step 314 from the starting table (Table 2). Then, the value of each selected variable ("Client", "Number") in the current data record of the starting table can be incorporated in the virtual data record in a step 316. Also, by using the conversion structure each value of each connecting variable ("Date", "Product") in the current data record of the starting table can be converted into a value of a corresponding selected variable ("Year", "Price"), this value also being incorporated in the virtual data record.

In step 318 the virtual data record can be used to build an intermediate data structure. Each data record of the intermediate data structure can accommodate each selected classification variable (dimension) and an aggregation field for each mathematical expression implied by the mathematical function. The intermediate data structure can be built based on the values of the selected variables in the virtual data record. Thus, each mathematical expression can be evaluated based on one or more values of one or more relevant calculation variables in the virtual data record, and the result can be aggregated in the appropriate aggregation field based on the combination of current values of the classification variables ("Client," "Year").

The above procedure can be repeated for one or more additional (e.g., all) data records of the starting table. In a step 320 it can be checked whether the end of the starting table has been reached. If not, the process can be repeated from step 314 and further data records can be read from the starting table. Thus, an intermediate data structure can be built by successively reading data records of the starting table, by incorporating the current values of the selected variables in a virtual data record, and by evaluating each mathematical expression based on the content of the virtual data record. If the current combination of values of classification variables in the virtual data record is new, a new data record can be created in the intermediate data structure to hold the result of the evaluation. Otherwise, the appropriate data record is rapidly found, and the result of the evaluation is aggregated in the aggregation field.

Thus, data records can be added to the intermediate data structure as the starting table is traversed. The intermediate data structure can be a data table associated with an efficient index system, such as an AVL or a hash structure. The aggregation field can be implemented as a summation register, in which the result of the evaluated mathematical expression is accumulated.

In some aspects, e.g. when evaluating a median, the aggregation field can be implemented to hold all individual results for a unique combination of values of the specified classification variables. It should be noted that only one virtual data record is needed in the procedure of building the intermediate data structure from the starting table. Thus, the content of the virtual data record can be updated for each data record of the starting table. This can minimize the memory requirement in executing the computer program.

After traversing the starting table, the intermediate data structure can contain a plurality of data records. If the intermediate data structure accommodates more than two classification variables, the intermediate data structure can, for each eliminated classification variable, contain the evaluated results aggregated over all values of this classification variable for each unique combination of values of remaining classification variables.

When the intermediate data structure has been built, a final data structure, e.g., a multidimensional cube, as shown in non-binary notation in Table 6 of FIG. 4, can be created in a step 322 by evaluating the mathematical function ("SUM (x*y)") based on the results of the mathematical expression ("x*y") contained in the intermediate data structure. In doing so, the results in the aggregation fields for each unique combination of values of the classification variables can be combined. In the example, the creation of the final data structure is straightforward, due to the trivial nature of the present mathematical function. The content of the final data structure can be presented to the user, for example in a two-dimensional table, in step 324, as shown in Table 7 of FIG. 4. Alternatively, if the final data structure contains many dimensions, the data can be presented in a pivot table, in which the user can interactively move up and down in dimensions, as is well known in the art.

In an aspect, step 322 can involve any of the processes described previously with regard to FIG. 5A through FIG. 5M as part of a process for creating the hypercube/multidimensional cube. For example, output from the logical inference engine 18 and/or 106 utilizing one or more BTIs and or one or more A2A indexes can be used in creation of the hypercube/multidimensional cube. When a user makes a selection, the inference engine 18 and/or 106 calculates a data subset of which one or more BTIs and/or A2A indexes can be generated and provided to the chart engine 58 and/or 108 for use in generating a hypercube/multidimensional cube and/or evaluating one or more expressions against a hypercube/multidimensional cube via one or more BTIs and/or A2A indexes as described with regard to FIG. 5A through FIG. 5M.

At step 326, input from the user can be received. For example, input form the user can be a selection and/or de-selection of the presented results.

Optionally, input from the user at step 326 can comprise a request for external processing. In an aspect, the user can be presented with an option to select one or more external engines to use for the external processing. Optionally, at step 328, data underlying the user selection can be configured (e.g., formatted) for use by an external engine. Optionally, at step 330, the data can be transmitted to the external engine for processing and the processed data can be received. The received data can undergo one or more checks to confirm that the received data is in a form that can be appended to the data model. For example, one or more of an integrity check, a format check, a cardinality check, combinations thereof, and the like. Optionally, at step 332, processed data can be received from the external engine and can be appended to the data model as described herein. In an aspect, the received data can have a lifespan that controls how long the received data persists with the data model. For example, the received data can be incorporated into the data model in a manner that enables a user to retrieve the received data at another time/session. In another example, the received data can persist only for the current session, making the received data unavailable in a future session.

FIG. 5A illustrates how a selection 50 operates on a scope 52 of presented data to generate a data subset 54. The data subset 54 can form a state space, which is based on a selection state given by the selection 50. In an aspect, the selection state (or "user state") can be defined by a user clicking on list boxes and graphs in a user interface of an application. An application can be designed to host a number of graphical objects (charts, tables, etc.) that evaluate one or more mathematical functions (also referred to as an "expression") on the data subset 54 for one or more dimensions (classification variables). The result of this evaluation creates a chart result 56 which can be a multidimensional cube which can be visualized in one or more of the graphical objects.

The application can permit a user to explore the scope 52 by making different selections, by clicking on graphical objects to select variables, which causes the chart result 56 to change. At every time instant during the exploration, there exists a current state space, which can be associated with a current selection state that is operated on the scope 52 (which always remains the same).

As illustrated in FIG. 5A, when a user makes a selection, the inference engine 18 calculates a data subset. Also, an identifier ID1 for the selection together with the scope can be generated based on the filters in the selection and the scope. Subsequently, an identifier ID2 for the data subset is generated based on the data subset definition, for example a bit sequence that defines the content of the data subset. ID2 can be put into a cache using ID1 as a lookup identifier. Likewise, the data subset definition can be put in the cache using ID2 as a lookup identifier.

As shown in FIG. 5A, a chart calculation in a calculation/chart engine 58 takes place in a similar way. Here, there are two information sets: the data subset 54 and relevant chart properties 60. The latter can be, but not restricted to, a mathematical function together with calculation variables and classification variables (dimensions). Both of these information sets can be used to calculate the chart result 56, and both of these information sets can be also used to generate identifier ID3 for the input to the chart calculation. ID2 can be generated already in the previous step, and ID3 can be generated as the first step in the chart calculation procedure.

The identifier ID3 can be formed from ID2 and the relevant chart properties. ID3 can be seen as an identifier for a specific chart generation instance, which can include all information needed to calculate a specific chart result. In addition, a chart result identifier ID4 can be created from the chart result definition, for example a bit sequence that defines the chart result 56. ID4 can be put in the cache using ID3 as a lookup identifier. Likewise, the chart result definition can be put in the cache using ID4 as a lookup identifier.

Optionally, further calculations, transforming, and/or processing can be included through an extension engine 62. Optionally, associated results from the inference engine 18 and further computed by hypercube computation in said calculation/chart engine 58 can be coupled to an external engine 64 that can comprise one or more data processing applications (e.g., simulation applications, statistical applications, mathematical computation applications, database applications, combinations thereof, and the like). Context of a data model processed by the inference engine 18 can comprise a tuple or tuples of values defined by dimensions and expressions computed by hypercube routines. Data can be exchanged through an interface 66.

The associated results coupled to the external engine 64 can be intermediate. Further results that can be final hypercube results can also be received from the external engine 64. Further results can be fed back to be included in the Data/Scope 52 and enrich the data model. The further results can also be rendered directly to the user in the chart result 56. Data received from and computed by the external engine 64 can be used for further associative discovery.

Each of the data elements of the database shown in Tables 1-5 of FIG. 2 has a data element type and a data element value (for example "Client" is the data element type and "Nisse" is the data element value). Multiple records can be stored in different database structures such as data cubes, data arrays, data strings, flat files, lists, vectors, and the like; and the number of database structures can be greater than or equal to one and can comprise multiple types and combinations of database structures. While these and other database structures can be used with, and as part of, the methods and systems disclosed, the remaining description will refer to tables, vectors, strings and data cubes solely for convenience.

Additional database structures can be included within the database illustrated as an example herein, with such structures including additional information pertinent to the database such as, in the case of products for example; color, optional packages, etc. Each table can comprise a header row which can identify the various data element types, often referred to as the dimensions or the fields, that are included within the table. Each table can also have one or more additional rows which comprise the various records making up the table. Each of the rows can contain data element values (including null) for the various data element types comprising the record.

The database as referred to in Tables 1-5 of FIG. 2 can be queried by specifying the data element types and data element values of interest and by further specifying any functions to apply to the data contained within the specified data element types of the database. The functions which can be used within a query can include, for example, expressions using statistics, sub-queries, filters, mathematical formulas, and the like, to help the user to locate and/or calculate the specific information wanted from the database. Once located and/or calculated, the results of a query can be displayed to the user with various visualization techniques and objects such as list boxes of a user interface illustrated in FIG. 6.

The graphical objects (or visual representations) can be substantially any display or output type including graphs, charts, trees, multi-dimensional depictions, images (computer generated or digital captures), video/audio displays describing the data, hybrid presentations where output is segmented into multiple display areas having different data analysis in each area and so forth. A user can select one or more default visual representations; however, a subsequent visual representation can be generated on the basis of further analysis and subsequent dynamic selection of the most suitable form for the data.

In an aspect, a user can select a data point and a visualization component can instantaneously filter and re-aggregate other fields and corresponding visual representations based on the user's selection. In an aspect, the filtering and re-aggregation can be completed without querying a database. In an aspect, a visual representation can be presented to a user with color schemes applied meaningfully. For example, a user selection can be highlighted in green, datasets related to the selection can be highlighted in white, and unrelated data can be highlighted in gray. A meaningful application of a color scheme provides an intuitive navigation interface in the state space.

Figure 6:
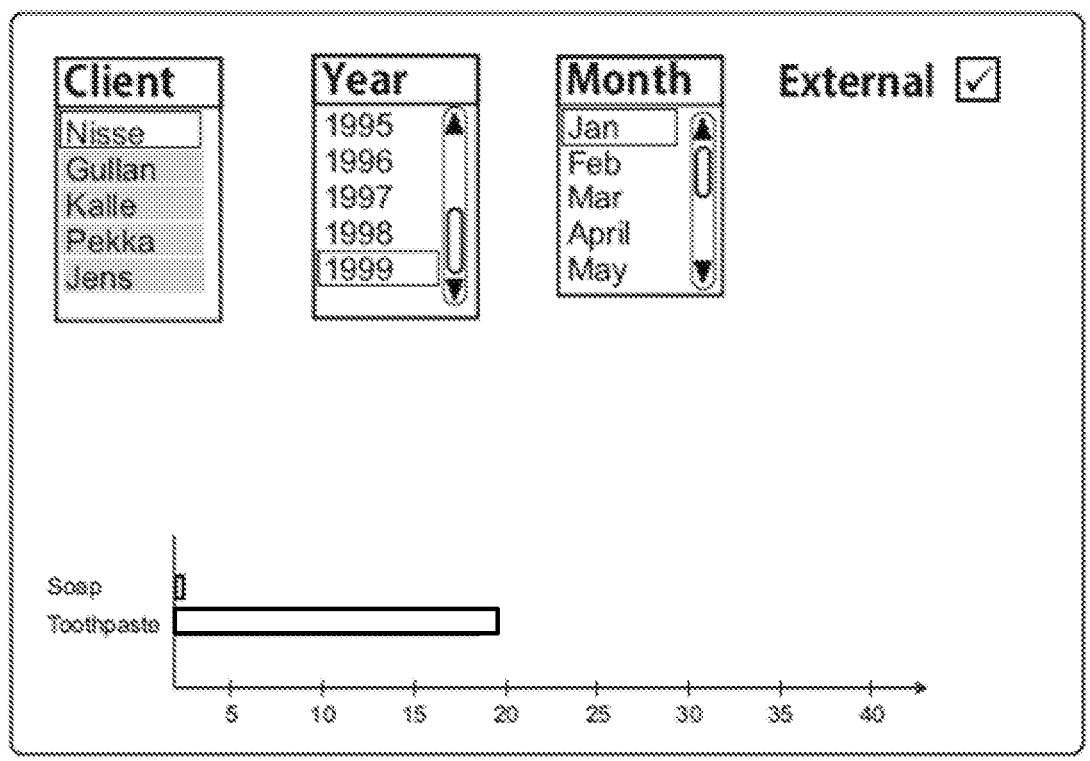
FIG. 6 is a schematic graphical presentation showing selections and a diagram of data associated to the selections as received after processing by an external engine.

The result of a standard query can be a smaller subset of the data within the database, or a result set, which is comprised of the records, and more specifically, the data element types and data element values within those records, along with any calculated functions, that match the specified query. For example, as indicated in FIG. 6, the data element value "Nisse" can be specified as a query or filtering criteria as indicated by a frame in the "Client" header row. In some aspects, the selected element can be highlighted in green. By specifically selecting "Nisse," other data element values in this row are excluded as shown by gray areas. Further, "Year" "1999" and "Month" "Jan" are selected in a similar way.

Figure 7:
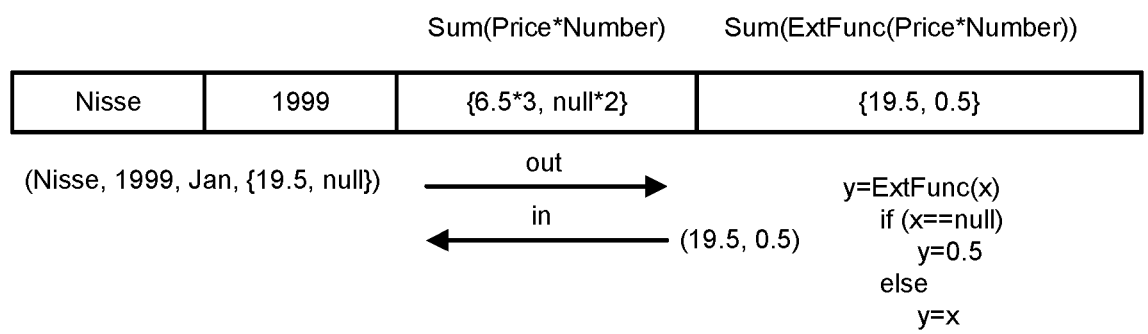
FIG. 7 is a schematic representation of data exchanged with an external engine based on selections in FIG. 6.

Optionally, in this application, external processing can also be requested by ticking "External" in the user interface of FIG. 6. Data as shown in FIG. 7 can be exchanged with an External engine 64 through the interface 66 of FIG. 5A. In addition to evaluating the mathematical function ("SUM (Price*Number)") based on the results of the mathematical expression ("Price*Number") contained in the intermediate data structure the mathematical function ("SUM (ExtFunc (Price*Number))") can be evaluated. Data sent out are (Nisse, 1999, January, {19.5, null}). In this case the external engine 64 can process data in accordance with the formula $$\text{if } (x == null)$$
$$y = 0.5$$
$$\text{else}$$
$$y = x$$

as shown in in FIG. 7. The result input through the interface 66 will be (19.5, 0.5) as reflected in the graphical presentation in FIG. 6.

Figure 8:
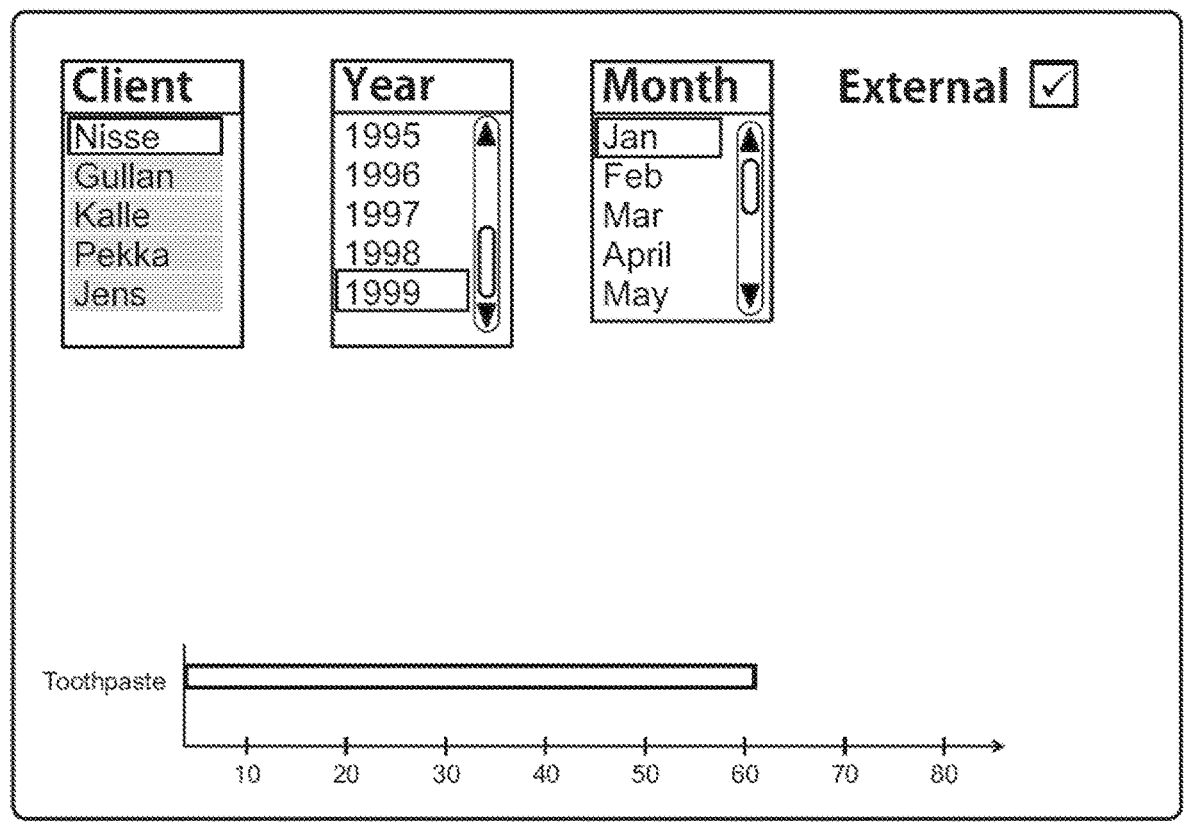
FIG. 8 is a schematic graphical presentation showing selections and a diagram of data associated to the selections as received after second computations from an external engine.
Figure 9:
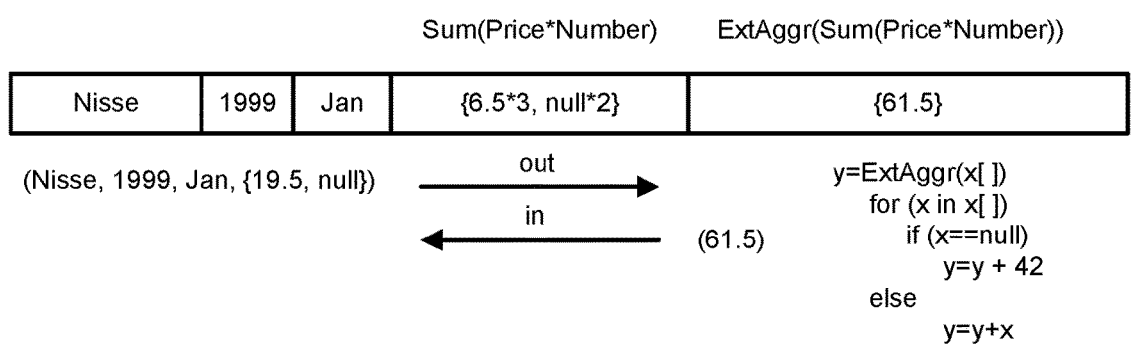
FIG. 9 is a schematic representation of data exchanged with an external engine based on selections in FIG. 8.

In a further aspect, external processing can also be optionally requested by ticking "External" in a box as shown in FIG. 8. Data as shown in FIG. 9 can be exchanged with an external engine 64 through the Interface 66 of FIG. 5A. In addition to evaluating the mathematical function ("SUM (Price*Number)") based on the results of the mathematical expression ("Price*Number") contained in the intermediate data structure the mathematical function $$\text{SUM(ExtFunc(Price*Number))}$$

can be evaluated. Data sent out are (Nisse, 1999, January, {19.5, null}). In this case the external engine 64 will process data in accordance with Function (1) as shown below and in FIG. 9. The result input through the Interface 66 will be (61.5) as reflected in the graphical presentation in FIG. 8.

$$y = \text{ExtAggr}(x[\,])$$
$$\text{for } (x \text{ in } x[\,])$$
$$\text{if } (x == null)$$
$$y = y + 42$$
$$\text{else}$$
$$y = y + x$$
Function (1)

Figure 13:
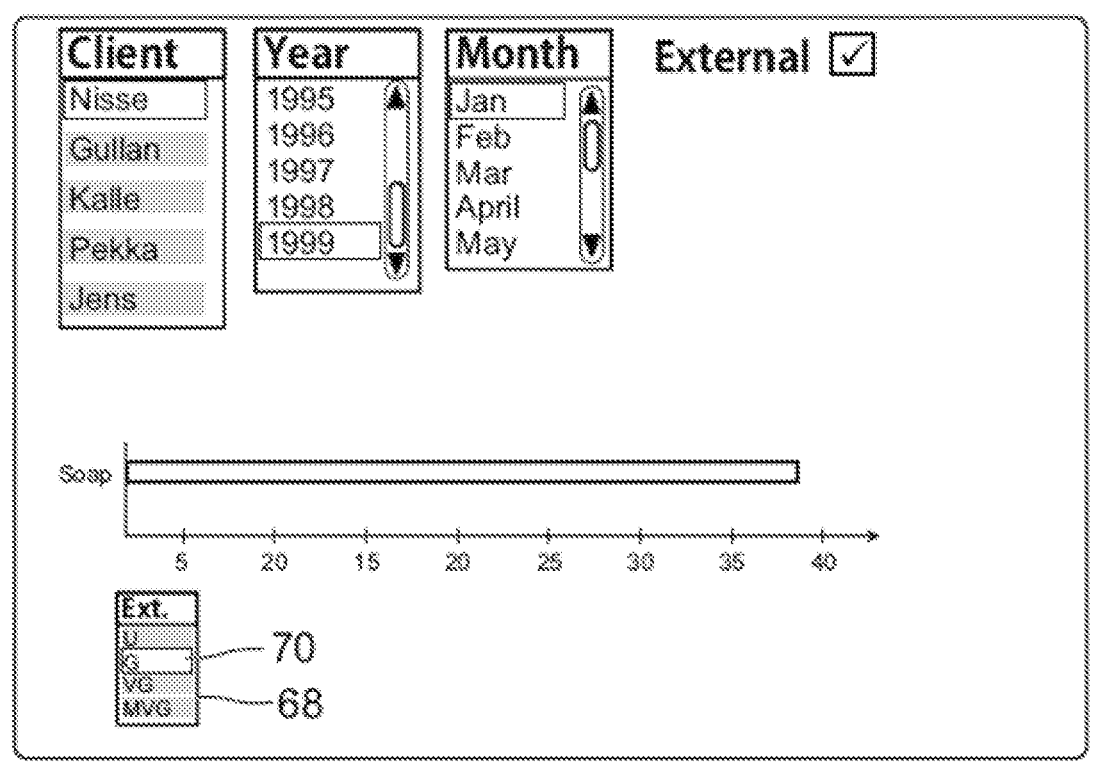
FIG. 13 is a schematic graphical presentation showing a further set of selections and a diagram of data associated to the selections as received after third computations from an external engine.

A further optional embodiment is shown in FIG. 10 and FIG. 11. The same basic data as in previous examples apply. A user selects "Pekka," "1999," "Jan," and "External." By selecting "External," already determined and associated results are coupled to the external engine 64. Feedback data from the external engine 64 based on an external computation, ExtQualification(Sum(Price*Number)), as shown in FIG. 13 will be the information "MVG." This information can be fed back to the logical inference engine 18. The information can also be fed back to the graphical objects of FIG. 10 and as a result a qualification table 68 will highlight "MVG" (illustrated with a frame in FIG. 10). Other values (U, G, and VG) are shown in gray areas. The result input through the Interface 66 will be Soap with a value of 75 as reflected in the graphical presentation (bar chart) of FIG. 10. FIG. 11 is a schematic representation of data exchanged with an external engine based on selections in FIG. 10. FIG. 12 is a table showing results from computations based on different selections in the presentation of FIG. 10.

Should a user instead select "Gullan," "1999," "Jan," and "External," the feedback signal would include "VG" based on the content shown in qualification table 68. The computations actually performed in the external engine 62 are not shown or indicated, since they are not relevant to the inference engine.

In FIG. 13 a user has selected "G" as depicted by 70 in the qualification table 68. As a result information fed back from the external engine 64 to the external engine 62 and further to the inference engine 18 the following information will be highlighted: "Nisse," "1999," and "Jan" as shown in FIG. 13. Furthermore, the result produced will be Soap 37.5 as reflected in the graphical presentation (bar chart) of FIG. 13.

Figure 14:
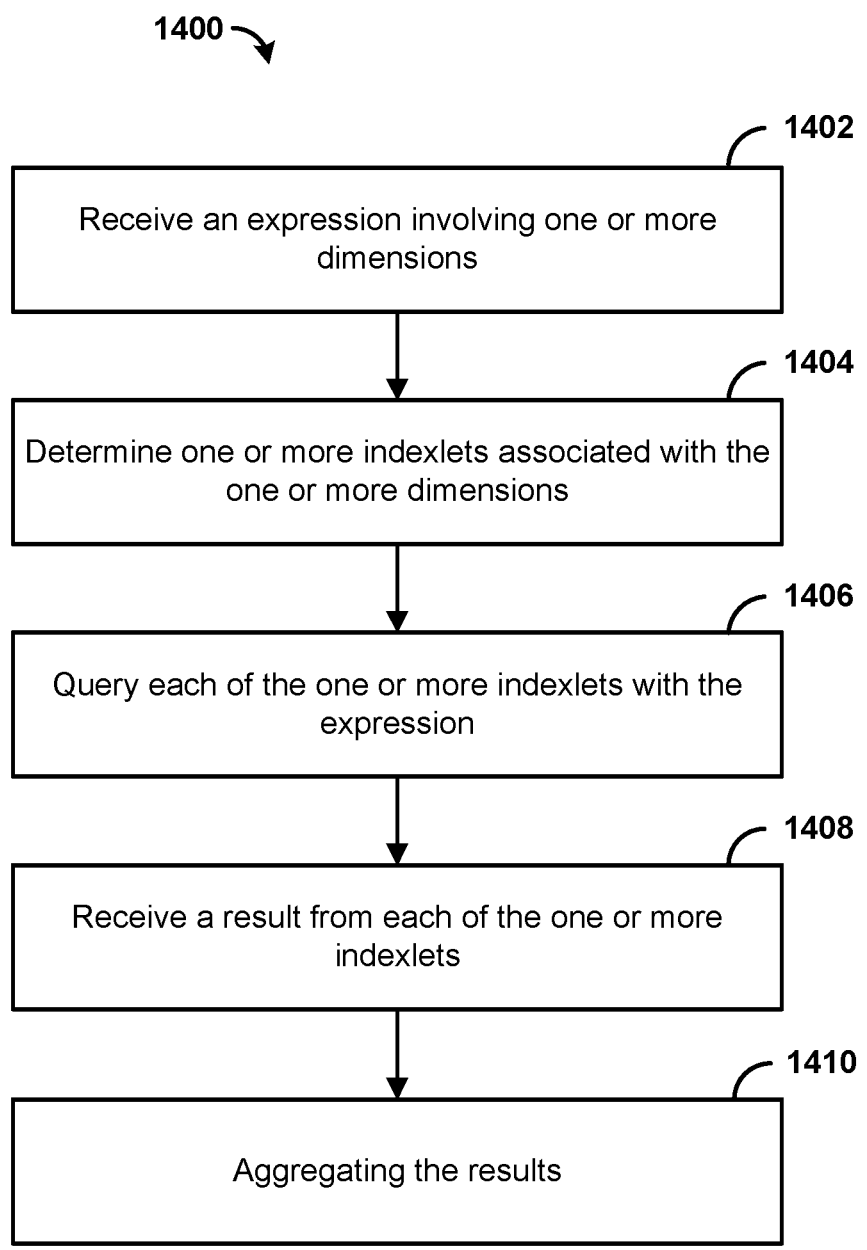
FIG. 14 is a flow chart illustrating an example method.

In an aspect, illustrated in FIG. 14 provided is a method 1400 comprising receiving an expression involving one or more dimensions at 1402. The method 1400 can comprise determining one or more indexlets associated with the one or more dimensions at 1404. The method 1400 can comprise querying each of the one or more indexlets with the expression at 1406. The method 1400 can comprise receiving a result from each of the one or more indexlets at 1408. The method 1400 can comprise aggregating the results at 1410. The expression can comprise a component independent operator, a summable operator, or a recursive operator. The one or more dimensions can be within a single table.

Figure 15:
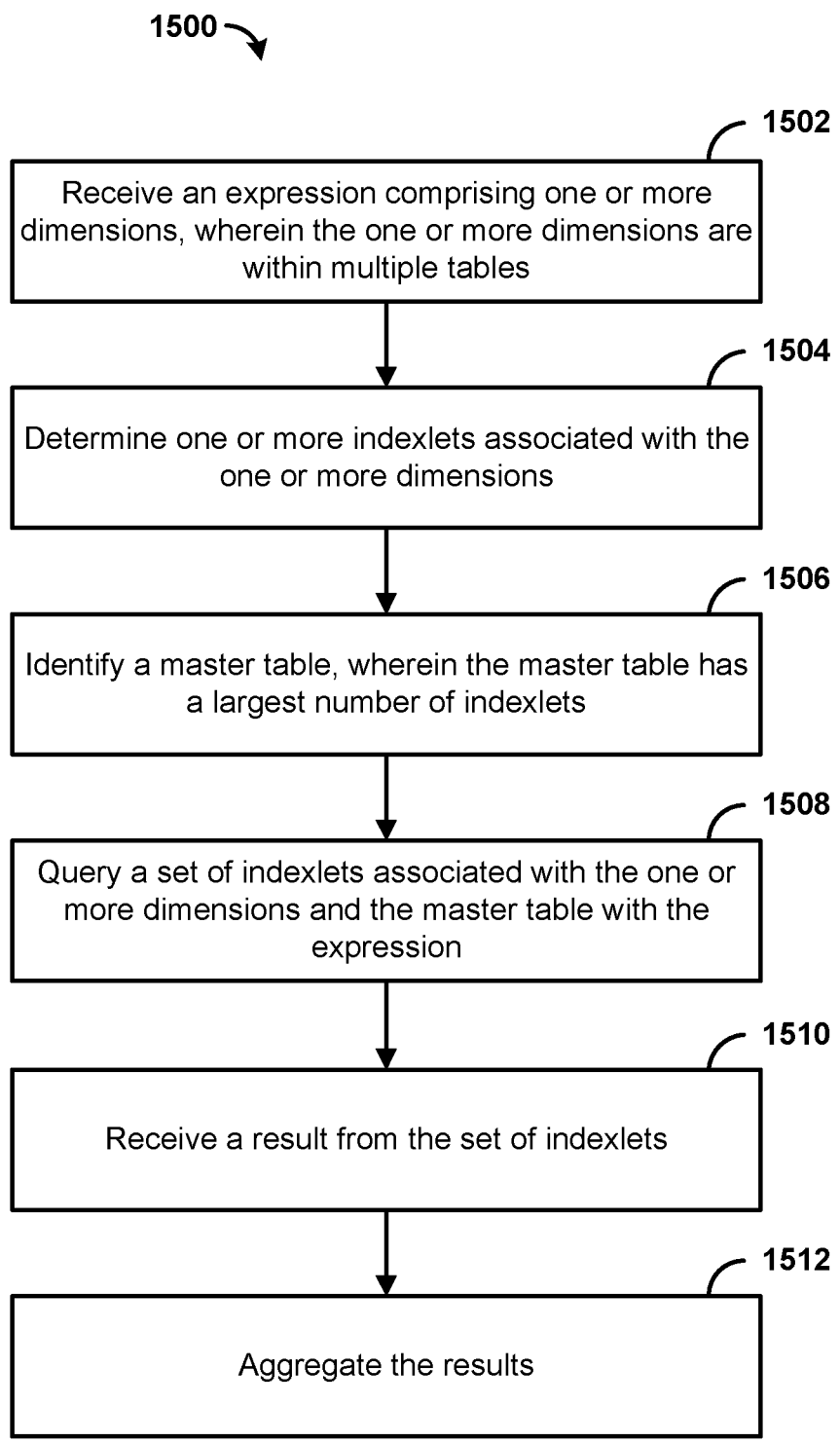
FIG. 15 is a flow chart illustrating another example method.

In an aspect, illustrated in FIG. 15 provided is a method 1500 comprising receiving an expression comprising one or more dimensions, wherein the one or more dimensions are within multiple tables at 1502. The method 1500 can comprise determining one or more indexlets associated with the one or more dimensions at 1504. The method 1500 can comprise identifying a master table, wherein the master table has a largest number of indexlets at 1506. The method 1500 can comprise querying a set of indexlets associated with the one or more dimensions and the master table with the expression, wherein the set of indexlets are configured to query other indexlets to evaluate the expression at 1508. The method 1500 can comprise receiving a result from the set of indexlets at 1510. The method 1500 can comprise aggregating the results at 1512. The expression can comprise a component independent operator, a summable operator, or a recursive operator. The other indexlets can comprise closest neighbors indexlets to the set of indexlets.

Figure 16:
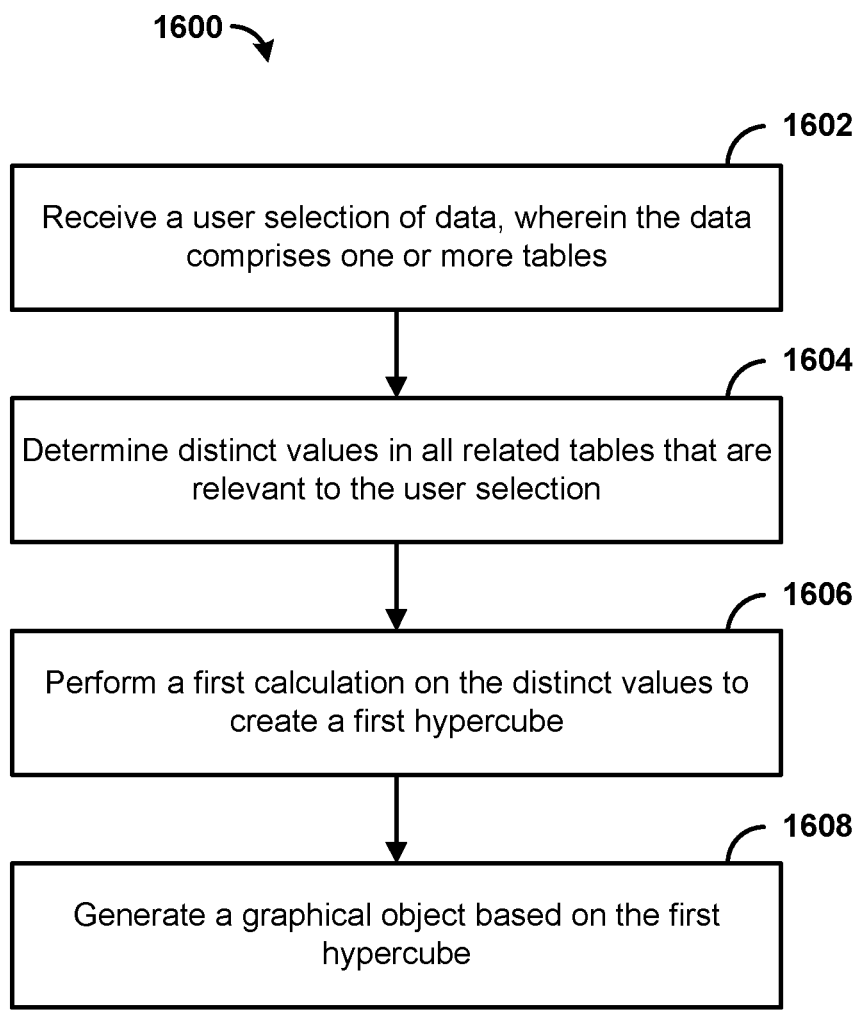
FIG. 16 is a flow chart illustrating another example method.

In an aspect, illustrated in FIG. 16 provided is a method 1600 comprising receiving a user selection of data, wherein the data comprises one or more tables at 1602. The method 1600 can comprise determining distinct values in all related tables that are relevant to the user selection based on at least one of one or more indexlets or an attribute to attribute (A2A) index at 1604. The method 1600 can comprise performing a first calculation on the distinct values to create a first hypercube at 1606. The method 1600 can comprise generating a graphical object based on the first hypercube at 1608.

Determining distinct values in all related tables that are relevant to the user selection based on at least one of the one or more indexlets or the attribute to attribute (A2A) index can comprise receiving an expression involving one or more dimensions, determining one or more indexlets associated with the one or more dimensions, querying each of the one or more indexlets with the expression, receiving a result from each of the one or more indexlets, and aggregating the results. The expression can comprise a component independent operator, a summable operator, or a recursive operator. The one or more dimensions are within a single table.

Determining distinct values in all related tables that are relevant to the user selection based on at least one of the one or more indexlets or the attribute to attribute (A2A) index can comprise receiving an expression comprising one or more dimensions, wherein the one or more dimensions are within multiple tables, determining one or more indexlets associated with the one or more dimensions, identifying a master table, wherein the master table has a largest number of indexlets, querying a set of indexlets associated with the one or more dimensions and the master table with the expression, wherein the set of indexlets are configured to query other indexlets to evaluate the expression, receiving a result from the set of indexlets, and aggregating the results. The expression can comprise a component independent operator, a summable operator, or a recursive operator. The other indexlets can comprise closest neighbors indexlets to the set of indexlets.

Figure 17:
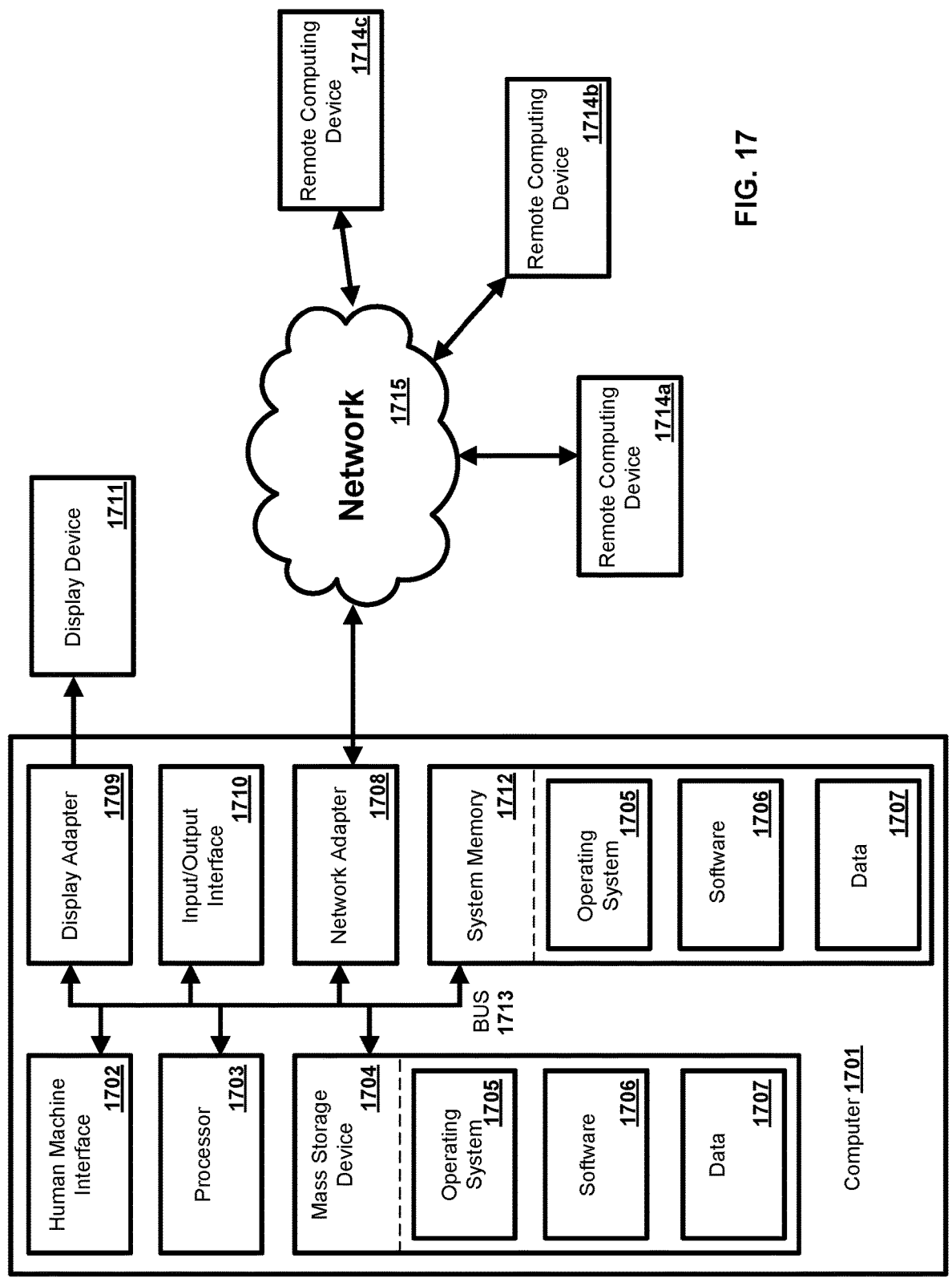
FIG. 17 is an exemplary operating environment for performing the disclosed methods.

In an exemplary aspect, the methods and systems can be implemented on a computer 1701 as illustrated in FIG. 17 and described below. Similarly, the methods and systems disclosed can utilize one or more computers to perform one or more functions in one or more locations. FIG. 17 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 1701. The components of the computer 1701 can comprise, but are not limited to, one or more processors 1703, a system memory 1712, and a system bus 1713 that couples various system components including the one or more processors 1703 to the system memory 1712. The system can utilize parallel computing.

The system bus 1713 represents one or more of several possible types of bus structures, including a memory bus or memory controller, a peripheral bus, an accelerated graphics port, or local bus using any of a variety of bus architectures. The bus 1713, and all buses specified in this description can also be implemented over a wired or wireless network connection and each of the subsystems, including the one or more processors 1703, a mass storage device 1704, an operating system 1705, software 1706, data 1707, a network adapter 1708, the system memory 1712, an Input/Output Interface 1710, a display adapter 1709, a display device 1711, and a human machine interface 1702, can be contained within one or more remote computing devices 1714a,b,c at physically separate locations, connected through buses of this form, in effect implementing a fully distributed system.

The computer 1701 typically comprises a variety of computer readable media. Exemplary readable media can be any available media that is accessible by the computer 1701 and comprises, for example and not meant to be limiting, both volatile and non-volatile media, removable and non-removable media. The system memory 1712 comprises computer readable media in the form of volatile memory, such as random access memory (RAM), and/or non-volatile memory, such as read only memory (ROM). The system memory 1712 typically contains data such as the data 1707 and/or program modules such as the operating system 1705 and the software 1706 that are immediately accessible to and/or are presently operated on by the one or more processors 1703.

In another aspect, the computer 1701 can also comprise other removable/non-removable, volatile/non-volatile computer storage media. By way of example, FIG. 17 illustrates the mass storage device 1704 which can provide non-volatile storage of computer code, computer readable instructions, data structures, program modules, and other data for the computer 1701. For example and not meant to be limiting, the mass storage device 1704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1704, including by way of example, the operating system 1705 and the software 1706. Each of the operating system 1705 and the software 1706 (or some combination thereof) can comprise elements of the programming and the software 1706. The data 1707 can also be stored on the mass storage device 1704. The data 1707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In an aspect, the software 1706 can comprise one or more of a script engine, a logical inference engine, a calculation engine, an extension engine, and/or a rendering engine. In an aspect, the software 1706 can comprise an external engine and/or an interface to the external engine.

In another aspect, the user can enter commands and information into the computer 1701 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 1703 via the human machine interface 1702 that is coupled to the system bus 1713, but can be connected by other interface and bus structures, such as a parallel port, game port, an IEEE 1394 Port (also known as a Firewire port), a serial port, or a universal serial bus (USB).

In yet another aspect, the display device 1711 can also be connected to the system bus 1713 via an interface, such as the display adapter 1709. It is contemplated that the computer 1701 can have more than one display adapter 1709 and the computer 1701 can have more than one display device 1711. For example, the display device 1711 can be a monitor, an LCD (Liquid Crystal Display), or a projector. In addition to the display device 1711, other output peripheral devices can comprise components such as speakers (not shown) and a printer (not shown) which can be connected to the computer 1701 via the Input/Output Interface 1710. Any step and/or result of the methods can be output in any form to an output device. Such output can be any form of visual representation, including, but not limited to, textual, graphical, animation, audio, tactile, and the like. The display device 1711 and computer 1701 can be part of one device, or separate devices.

The computer 1701 can operate in a networked environment using logical connections to one or more remote computing devices 1714a,b,c. By way of example, a remote computing device can be a personal computer, portable computer, smartphone, a server, a router, a network computer, a peer device or other common network node, and so on. Logical connections between the computer 1701 and a remote computing device 1714a,b,c can be made via a network 1715, such as a local area network (LAN) and/or a general wide area network (WAN). Such network connections can be through the network adapter 1708. The network adapter 1708 can be implemented in both wired and wireless environments. In an aspect, one or more of the remote computing devices 1714a,b,c can comprise an external engine and/or an interface to the external engine.

For purposes of illustration, application programs and other executable program components such as the operating system 1705 are illustrated herein as discrete blocks, although it is recognized that such programs and components reside at various times in different storage components of the computing device 1701, and are executed by the one or more processors 1703 of the computer. An implementation of the software 1706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
receiving an expression comprising a plurality of attributes, wherein the plurality of attributes are associated with a plurality of dimensions of data records stored in a plurality of tables;
determining, based on the expression and an attribute-to-attribute (A2A) index, a plurality of indexlets associated with the expression, wherein the A2A index maps the plurality of attributes to the plurality of indexlets, wherein the plurality of indexlets are associated with at least one bidirectional global attribute list, and wherein an entry in the at least one bidirectional global attribute list associated with a particular attribute, of the plurality of attributes, comprises a reference to an indexlet, of the plurality of indexlets, corresponding to that attribute; and
determining, based on the plurality of indexlets, a result of the expression, wherein each indexlet, of the plurality of indexlets, indicates whether a particular attribute value associated with one of the plurality of attributes of the expression is present or not present in each row of a block of rows within a table, of the plurality of tables, corresponding to that indexlet.

2. The method of claim 1, wherein the plurality of indexlets bidirectionally index blocks of rows of each of the plurality of tables to the A2A index based on the plurality of attributes.

3. The method of claim 1, wherein the plurality of indexlets bidirectionally index blocks of rows of each of the plurality of tables to the A2A index based on the plurality of dimensions.

4. The method of claim 1, wherein determining the result of the expression comprises:
querying each of the plurality of indexlets with the plurality of attributes of the expression; and
receiving a result from each of the plurality of indexlets.

5. The method of claim 4, further comprising:
generating, based on the results, at least one graphical object.

6. The method of claim 1, wherein the expression comprises at least one of: a component independent operator, a summable operator, or a recursive operator.

7. A method comprising:
receiving an expression comprising a plurality of attributes, wherein the plurality of attributes are associated with a plurality of dimensions of data records stored in a plurality of tables;
determining, based on the expression and an attribute-to-attribute (A2A) index, a plurality of indexlets associated with the expression, wherein the A2A index maps the plurality of attributes to the plurality of indexlets, wherein the plurality of indexlets are associated with at least one bidirectional global attribute list, and wherein an entry in the at least one bidirectional global attribute list associated with a particular attribute, of the plurality of attributes, comprises a reference to an indexlet, of the plurality of indexlets, corresponding to that attribute; and
generating, based on the plurality of indexlets and the expression, at least one graphical object, wherein each indexlet, of the plurality of indexlets, indicates whether a particular attribute value associated with one of the plurality of attributes of the expression is present or not present in each row of a block of rows within a table, of the plurality of tables, corresponding to that indexlet.

8. The method of claim 7, wherein generating the at least one graphical object comprises:
querying each of the plurality of indexlets with the plurality of attributes of the expression;
receiving a result from each of the plurality of indexlets; and
generating, based on the result of the expression, the at least one graphical object.

9. The method of claim 7, wherein generating the at least one graphical object comprises:
determining, based on the plurality of indexlets, a result of the expression; and
generating, based on the result of the expression, the at least one graphical object.

10. The method of claim 7, wherein the at least one bidirectional global attribute list, for each of the plurality of attributes, comprises a reference to at least one of the plurality of indexlets that corresponds to that attribute.

11. The method of claim 7, wherein the plurality of indexlets bidirectionally index blocks of rows of each of the plurality of tables to the A2A index based on at least one of: the plurality of attributes or the plurality of dimensions.

12. An apparatus comprising:
one or more processors; and
memory storing processor-executable instructions that, when executed by the one or more processors, cause the apparatus to:
receive an expression comprising a plurality of attributes, wherein the plurality of attributes are associated with a plurality of dimensions of data records stored in a plurality of tables;
determine, based on the expression and an attribute-to-attribute (A2A) index, a plurality of indexlets associated with the expression, wherein the A2A index maps the plurality of attributes to the plurality of indexlets, wherein the plurality of indexlets are associated with at least one bidirectional global attribute list, and wherein an entry in the at least one bidirectional global attribute list associated with a particular attribute, of the plurality of attributes, comprises a reference to an indexlet, of the plurality of indexlets, corresponding to that attribute; and
determine, based on the plurality of indexlets, a result of the expression, wherein each indexlet, of the plurality of indexlets, indicates whether a particular attribute value associated with one of the plurality of attributes of the expression is present or not present in each row of a block of rows within a table, of the plurality of tables, corresponding to that indexlet.

13. The apparatus of claim 12, wherein the plurality of indexlets bidirectionally index blocks of rows of each of the plurality of tables to the A2A index based on the plurality of attributes.

14. The apparatus of claim 12, wherein the plurality of indexlets bidirectionally index blocks of rows of each of the plurality of tables to the A2A index based on the plurality of dimensions.

15. The apparatus of claim 12, wherein the processor-executable instructions that cause the apparatus to determine the result of the expression further cause the apparatus to:
query each of the plurality of indexlets with the plurality of attributes of the expression; and
receive a result from each of the plurality of indexlets.

16. The apparatus of claim 15, wherein the processor-executable further cause the apparatus to:
generate, based on the results, at least one graphical object.

* * * * *